(12) United States Patent
Eberhardt et al.

(10) Patent No.: US 11,167,936 B2
(45) Date of Patent: Nov. 9, 2021

(54) CONVEYANCE SYSTEM FOR CONVEYING OBJECT CARRIERS

(71) Applicant: Beckman Coulter, Inc., Brea, CA (US)

(72) Inventors: Michael Eberhardt, Munich (DE); Manuel Sickert, Purgen (DE); Luciano Brueggemann, Munich (DE)

(73) Assignee: Beckman Coulter, Inc., Brea, CA (US)

( * ) Notice: Subject to any disclaimer, the term of this patent is extended or adjusted under 35 U.S.C. 154(b) by 20 days.

(21) Appl. No.: 16/494,705

(22) PCT Filed: Mar. 13, 2018

(86) PCT No.: PCT/IB2018/051657
§ 371 (c)(1),
(2) Date: Sep. 16, 2019

(87) PCT Pub. No.: WO2018/167662
PCT Pub. Date: Sep. 20, 2018

(65) Prior Publication Data
US 2021/0122584 A1 Apr. 29, 2021

(30) Foreign Application Priority Data
Mar. 16, 2017 (EP) .................. 17000431

(51) Int. Cl.
*B65G 47/71* (2006.01)
*B65G 47/82* (2006.01)
(Continued)

(52) U.S. Cl.
CPC ............. *B65G 47/71* (2013.01); *B65G 47/82* (2013.01); *G01N 35/00732* (2013.01);
(Continued)

(58) Field of Classification Search
CPC ...... B65G 47/68; B65G 47/846; B65G 47/71; B65G 47/82; B65G 47/90;
(Continued)

(56) References Cited

U.S. PATENT DOCUMENTS 8,701,863 B2 * 4/2014 Abbestam ............ B65G 47/71
198/370.01
9,248,980 B2 * 2/2016 Pedrazzini ............ B65G 47/46
(Continued)

FOREIGN PATENT DOCUMENTS

| EP | 1106542 A1 | 6/2001 |
| EP | 3376233 A1 | 9/2018 |
| WO | WO-2018167662 A1 | 9/2018 |

OTHER PUBLICATIONS

"European Application Serial No. 17000431.1, Extended European Search Report dated Jun. 16, 2017", 7 pgs.
(Continued)

*Primary Examiner* — James R Bidwell
(74) *Attorney, Agent, or Firm* — Schwegman Lundberg & Woessner, P.A.

(57) ABSTRACT

Disclosed aspects relate to a conveyance system and method for conveying a plurality of object carriers. The conveyance system comprises at least one first conveyor lane section, and at least, two second conveyor lane sections. The conveyance system further comprises a rotatable diverting element for diverting an object carrier of the plurality of object carriers between the at least one first conveyor lane section and one of the at least two second conveyor lane sections of the conveyance system.

14 Claims, 14 Drawing Sheets

(51) Int. Cl.
*G01N 35/00* (2006.01)
*G01N 35/04* (2006.01)
*B65G 47/90* (2006.01)

(52) U.S. Cl.
CPC .............. *G01N 35/04* (2013.01); *B65G 47/90* (2013.01); *B65G 2203/0283* (2013.01); *B65G 2203/04* (2013.01); *G01N 2035/047* (2013.01)

(58) Field of Classification Search
CPC ........ B65G 2203/0283; B65G 2203/04; G01N 35/04; G01N 35/00732
USPC ............................ 198/441, 437, 450, 457.07
See application file for complete search history.

(56) References Cited

U.S. PATENT DOCUMENTS

| | | | | |
|---|---|---|---|---|
| 9,505,563 | B2* | 11/2016 | Otts | B65G 47/71 |
| 10,364,105 | B2* | 7/2019 | Eckerstrom | B65G 47/681 |
| 2005/0207937 | A1* | 9/2005 | Itoh | G01N 35/04 |
| | | | | 422/63 |
| 2012/0228094 | A1* | 9/2012 | Ohman | B65G 47/71 |
| | | | | 198/867.01 |
| 2016/0039615 | A1* | 2/2016 | Otts | B65G 47/71 |
| | | | | 198/368 |
| 2017/0015508 | A1 | 1/2017 | Almberg et al. | |

OTHER PUBLICATIONS

"European Application Serial No. 17000431.1, Response filed Mar. 12, 2019 to Extended European Search Report dated Jun. 16, 2017", 23 pgs.

"International Application Serial No. PCT/IB2018/051657, International Preliminary Report on Patentability dated Sep. 26, 2019", 8 pgs.

"International Application Serial No. PCT/IB2018/051657, International Search Report dated May 2, 2018", 3 pgs.

"International Application Serial No. PCT/IB2018/051657; Written Opinion dated May 2, 2018", 6 pgs.

* cited by examiner

CONVEYANCE SYSTEM FOR CONVEYING OBJECT CARRIERS

CROSS-REFERENCE TO RELATED APPLICATION

This application is a U.S. National Stage Filing under 35 U.S.C. 371 from International Application No. PCT/IB2018/051657, filed on Mar. 13, 2018, and published as WO 2018/167662 on Sep. 20, 2018, which claims the benefit of European Patent Appl. No. 17000431.1 filed Mar. 16, 2017, which applications and publication are incorporated herein by reference in their entirety.

The technical field of the present application is handling equipment that moves materials from one location to another. Such equipment is commonly referred to as a conveyor system or conveyance system. More specifically, aspects of the application relate to conveying a plurality of object carriers. Conveyance systems discussed in the present application may be particularly suitable for conveying chemical, pharmaceutical, or laboratory objects. For example, the objects may be tubes containing samples. The samples may be in fluid form and may contain substances such as blood or other bodily fluids. In particular, the disclosed conveyance systems may be used in medical laboratories to transport samples from one station to another station.

The conveyance system may include multiple conveyor lanes and each conveyor lane may have multiple conveyor lane sections. It may be desirable to move object carriers from a section of a first conveyor lane to a section of a second conveyor lane. For example, the desired destination of an object carrier may depend on the objects carried by the object carrier. Accordingly, multiple object carriers carrying a variety of objects may be conveyed on the first conveyor lane. Depending on the objects contained within the object carrier, it may be desirable to divert or move the object carrier from the first conveyor lane to the second conveyor lane. More particularly, it may be desirable to divert or move the object carrier from a section of the first conveyor lane to a section of the second conveyor lane. The diverting may be carried out via a diverting element, such as a rotatable disc.

A first conveyor lane section may also be referred to as an input conveyor lane section, such that an object carrier moving on a conveyor lane toward the diverting element may be conveyed on the first conveyor lane section. Moreover, a second conveyor lane section may also be referred to as an output conveyor lane section, such that an object carrier being conveyed on the second conveyor lane section may be conveyed away from the diverting element.

In a conventional conveyance system, sensors are often spread out over multiple conveyor lanes, both before and after the diverting element. Some or all of the sensors may be implemented as through beam sensors, also referred to as light barriers. These sensors may detect the passage of object carriers along conveyor lane sections and trigger a corresponding rotation of the diverting element. Further, cables are required to connect the through beam sensors placed along the conveyor belts to a control unit. In addition, complicated software is conventionally required to calculate when to rotate the diverting element once an object carrier has been detected on the conveyor lane.

Moreover, conventional conveyance systems often require exit sensors (e.g., also through beam sensors) to be located downstream from the diverting element in order to detect release of the object carrier and notify the control unit when the object carrier is clear of the diverting element. In addition, information provided by the sensors is necessarily imprecise, since it is necessary to calculate when the object carrier will contact the diverting element based on information received from a sensor located some distance away from the diverting element. For more precision, it would be desirable to know when the object carrier is in close proximity (e.g., less than 60 cm or less than 40 cm) to the diverting element or when the object carrier contacts the diverting element. The large number of sensors and extensive cabling required in conventional systems can be expensive and difficult to maintain.

Conventional conveyance systems may also be heavily dependent on timing, requiring complex management software. In particular, sensors are spread throughout the system, at various distances from the rotatable disc. Some sensors are quite far away from the disc. Therefore, the system must wait for some time after the detection of an object carrier, prior to rotating the disc. If the disc rotates too early, the object carrier may not have arrived yet. In case the disc waits too long to rotate, the overall throughput of the system decreases. Determining when to rotate the disc in order to maximize system throughput may be complicated.

Further, conventional systems often require multiple physical entities that are capable of rotation and cooperate to divert an object carrier from a first conveyor lane section to a second conveyor lane section. Accordingly, it may be desirable to integrate all or most components needed to divert an object carrier from a first conveyor lane section to a second conveyor lane section. In particular, it may be desirable to bring the components as close together as possible, e.g., include the components on a single physical entity. This may make the components easier to control and maintain.

Moreover, it may be desirable to detect an object carrier when the object carrier is proximate to the diverting element (e.g., within 60 cm or within 40 cm), such that it is not necessary to calculate the progress of the object carrier over a long distance (or around a curve or corner) in order to determine when to rotate the diverting element. In addition, it may be desirable to reduce the number of conveyance system components (e.g., sensors and/or the rotatable gate) and reduce the maintenance required in comparison to conventional approaches. Moreover, it may be desirable to improve the reliability of the process of diverting an object carrier between a first conveyor lane section and a second conveyor lane section.

It is an object of the present disclosure to solve one or more of the problems mentioned above.

According to an aspect, a conveyance system for conveying a plurality of object carriers is provided. The conveyance system comprises at least one first conveyor lane section, and at least two second conveyor lane sections. The conveyance system further comprises a rotatable diverting element for diverting an object carrier of the plurality of object carriers between the at least one first conveyor lane section and one of the at least two second conveyor lane sections of the conveyance system. The diverting element comprises at least one sensor element for detecting the object carrier when the object carrier is:

being conveyed toward the diverting element, or contacting the diverting element, or being transported away from the diverting element by the conveyance system.

The diverting element further comprises an axis of rotation adjacent to the first conveyor lane section and one of the second conveyor lane sections. The axis of rotation may be between two conveyor lanes, one of which includes the first conveyor lane section and the other of which includes one of the second conveyor lane sections. The axis of rotation is perpendicular to a direction of conveyance of the first conveyor lane section and/or the two second conveyor lane sections.

The rotatable diverting element may have multiple receiving positions, in which one of the object carriers can be received by the diverting element (e.g., within a concave portion of the diverting element), and multiple releasing positions, in which the object carrier that was received can be released (e.g., disengaged) from the diverting element. In some cases, the diverting element may have one receiving position for each input conveyor lane section (i.e., as many receiving positions as there are input conveyor lanes) and one releasing position for each output conveyor lane section (i.e., as many releasing positions as there are output conveyor lane sections).

The object carrier may be substantially cylindrical (e.g., a right circular cylinder). Further, the object carrier may have a shape complementing the shape of the diverting element, such that the object carrier fits into a portion of the diverting element and/or the object carrier is supported by the diverting element when the object carrier is received by the diverting element.

In some cases, the conveyance system comprises a plurality of conveyor lanes. Each conveyor lane may include a plurality of conveyor lane sections. Conveyor lane sections may refer to physical or logical divisions of a conveyor lane. For example, physical conveyor lane sections may be one or more overlapping parts of a conveyor lane or divisions between rollers on a conveyor lane. Logical conveyor lane sections may refer to divisions created by the presence of the diverting element. For example, the first conveyor lane sections may be on one side of the diverting element and the second conveyor lane sections may be on the opposite side of the diverting element. Accordingly, an object carrier may be conveyed (or moved) toward the diverting element on the first conveyor lane section and may be conveyed (or moved) away from the diverting element on one of the second conveyor lane sections. More particularly, the object carrier may move toward the axis of rotation of the diverting element on the first conveyor lane section and may move away from the axis of rotation of the diverting element on either of the second conveyor lane sections.

The rotatable diverting element may change the course of the object carrier by diverting the object carrier. In particular, the diverting element may divert the object carrier through a region between the at least one first conveyor lane section and one of the at least two second conveyor lane sections of the conveyance system. More specifically, the diverting element may divert the object carrier from the first conveyor lane section to one of the at least two second conveyor lane sections.

At any given time, there may be a plurality of object carriers in motion on the conveyance system. Further, the conveyance system may be symmetrical, such that there are as many first conveyor lane sections as there are second conveyor lane sections.

In some cases, the conveyance system may comprise a plurality of interchangeable parts, such that conveyor lane sections can be added or removed as needed. For example, a subset (possible a proper subset) of the second conveyor lane sections may be associated with a station. Objects within the object carriers may be processed at each station. In some cases, different stations process different objects. For example, a first station may process blood and not urine and a second station may process urine and not blood. One station may be temporarily out of service and conveyor lane sections leading to that station may be removed. Alternatively, a new station may be added and new conveyor lane sections leading to that station may be added to the conveyance system.

The sensor element may comprise a plurality of sensors. The sensors may be implemented using the same sensor technologies or using different sensor technologies. When the sensor element comprises more than one sensor, this may have the advantage of improving reliability, e.g., the system may be able to keep operating after failure of one or more sensors.

The sensor element may include a proximity sensor to detect the object carrier when the object carrier is being conveyed toward the diverting element. In some cases, multiple proximity sensors may be used. It may be advantageous to use multiple proximity sensors in the interest of reliability or so that the system can continue to operate if one sensor fails.

The sensor element may include a tactile or touch sensor for detecting the object carrier when the object carrier is contacting the diverting element. Multiple tactile sensors may be used in the interest of reliability and/or redundancy. Proximity sensors, tactile sensors and other types of sensors (e.g., pressure sensors) may be used in combination. The combination of different types of sensors may improve reliability and/or redundancy.

For example, when the sensor element includes an RFID reader and an optical sensor, reliability may be enhanced. The RFID reader may detect the presence of an RFID tagged object carrier at the diverting element. The optical sensor may detect the presence of the object carrier even if the RFID sensor has failed. A redundant sensor, such as the optical sensor, may be used to detect errors (e.g., a non-functioning RFID reader or RFID tag) or an invalid state and initiate error handling. In particular, data from the sensor element may be sent to the control unit and analyzed to determine errors, e.g., if one of the sensors of the sensor element is not functioning or if object carriers are not equipped with RFID tags.

The proximity sensor of the sensor element may also be used for detecting the object carrier when the object carrier is being transported away from the diverting element by the conveyance system. Alternatively, the absence of contact on the tactile sensor of the sensor element can also be used to detect that the object carrier is being transported away from the diverting element.

The axis of rotation of the diverting element may be between the first conveyor lane section and one of the second conveyor lane sections. More specifically, the axis of rotation of the diverting element may be between the first conveyor lane (including at least one first conveyor lane section and at least one second conveyor lane section) and the second conveyor lane (including at least one first conveyor lane section and at least one second conveyor lane section that are not in the first conveyor lane).

In some cases, the axis of rotation of the diverting element is perpendicular to a direction of conveyance of the first conveyor lane section and the two second conveyor lane sections. In other cases, the axis of rotation of the diverting element is perpendicular to the direction of conveyance of the first conveyor lane section and only one of the second conveyor lane sections.

The diverting element is located such that rotation of the diverting element can cause an object carrier of the plurality of object carriers to be diverted between the at least one first conveyor lane section and one of the at least two second conveyor lane sections of the conveyance system. More particularly, the diverting element may be positioned such that when the object carrier is in contact with the diverting element, rotation of the diverting element causes the object carrier to pass through a region between the at least one first conveyor lane section and one of the at least two second conveyor lane sections.

The direction of conveyance of the first conveyor lane section and the two second conveyor lane sections may be the same direction. For example, a first of the second conveyor lane sections may be parallel to a second of the second conveyor lane sections. The direction of conveyance may also be referred to as a direction of movement or a direction of transport. In particular, the direction of conveyance may be the direction in which the object carrier is transported.

In some cases, the diverting element further comprises an engaging element. The engaging element may be adapted for engaging the object carrier, which has been detected by the sensor element, while the object carrier is being diverted between the first conveyor lane section and one of the second conveyor lane sections. In addition, the engaging element may be adapted for releasing the engaged object carrier when diverting of the object carrier is completed. Engaging the object carrier may comprise holding and/or contacting the object carrier. Accordingly, by means of the engaging element, the diverting element may support the object carrier while the object carrier is being diverted between the at least one first conveyor lane section and one of the at least two second conveyor lane sections.

Diverting of the object carrier may be completed when the object carrier has been diverted from the at least one first conveyor lane section to one of the at least two second conveyor lane sections. In other words, diverting the object carrier between the at least one first conveyor lane section and one of the at least two second conveyor lane sections may comprise bringing the object carrier from the first conveyor lane section to one of the two second conveyor lane sections. Once the object carrier is brought to its destination conveyor lane section, the object carrier may be conveyed in the direction of conveyance of the second conveyor lane section.

The engaging element may be configured to engage a corresponding engaging portion on the object carrier. The engaging portion may be implemented as ferromagnetic material, to be engaged by a corresponding magnet of the engaging element. Alternatively or in addition, the engaging portion may be implemented mechanically. For example, the engaging portion may be implemented as a protrusion of the object carrier that fits into a corresponding aperture in the engaging element. Alternatively, the engaging portion may be implemented as an aperture in the object carrier that engages with a protrusion of the engaging element.

In an example including a mechanical implementation of the engaging element and the engaging portion, a first vertical movement of the diverting element may cause the engaging element to engage the engaging portion, and lead to a corresponding vertical movement of the object carrier. Accordingly, after rotation of the diverting element, a second vertical movement of the diverting element leads to a disengagement of the engaging portion of the object carrier from the engaging element of the diverting element. The first vertical movement may be an upward movement and the second vertical movement may be a downward movement. Additional vertical movements may also be made, e.g., during rotation of the diverting element. This interaction of the engaging element with the object carrier may be referred to as passive, since the interaction (specifically the first vertical movement) is initiated when the object carrier contacts the engaging element.

In the context of the present application, "vertical" may be understood with respect to an x-y plane formed by the conveyance system, such that vertical is along a z-axis perpendicular to the plane of the conveyance system. The frame of reference for the present application is the earth.

The engaging element may include one or more of the following: at least one magnet, a fastening device (e.g., a lock or clamp), a suctioning device.

The magnet or magnets, fastening device, and suctioning device may be used individually or in combination as the engaging element or part of the engaging element. The engaging element may correspond to an engaging portion of the object carrier. When the magnet is used, the engaging portion of the object carrier may include a ferromagnetic portion. The ferromagnetic portion may comprise iron, nickel, or an alloy.

In some cases (e.g., when implemented as a clamp), the fastening device may be capable of gripping the object carrier and holding the object carrier while the object carrier is being diverted by the diverting element.

In an implementation of the engaging element including a lock, the engaging element may fit into the corresponding engaging portion of the object carrier (or a part thereof) similar to the way a key fits into a conventional lock. The lock may be used to hold the object carrier in place while the object carrier is being diverted between the first conveyor lane section and one of the second conveyor lane sections.

In particular, the engaging element may include a "one-pin lock", i.e., a pin that is mounted on the diverting element. In particular, the diverting element may be implemented as a rotatable disc, and the pin may be mounted in a concave portion of the disc. When there is an object carrier in the concave portion of the disc, the pin can be moved along its long axis into the carrier and hold the carrier within the concave portion during rotation of the disc.

The one pin lock may be simpler than other locks, such as twist locks. The twist lock also includes a pin. The pin of the twist lock has an additional feature at its tip. The pin of the twist lock would hold the object carrier, but, this would require a rotation of the pin along its long axis in order to lock the carrier within the concave portion of the disc during rotation.

In an implementation of the engaging element including a suctioning device, the engaging element may be used to create a region of low pressure so as to cause the object carrier to remain in contact with the diverting element while the object carrier is being diverted between the first conveyor lane section and one of the two second conveyor lane sections. The suctioning device may include a radial flow pump, also referred to as a centrifugal pump.

The engaging element may ensure that the object carrier arrives in the desired conveyor lane section after being diverted by the diverting element. Therefore, the engaging element may hold the object carrier during the rotation of the diverting element and only release the object carrier at the correct conveyor lane section (e.g., one of the second conveyor lane sections). In comparison to the passive engaging element, the active engaging element may make it easier to ensure that the object carrier arrives at the correct conveyor lane section.

The diverting element may include a disc. In particular, the diverting element may be substantially disc-shaped, i.e., basically round and flat. The disc may include a concave portion extending from the periphery of the disc toward the center of the disc. The disc may be substantially crescent-shaped, such that the area of the opening of the crescent is considerably smaller than (e.g., less than half) the area of the solid portion of the crescent. The size of the concave portion of the disc may be suitable for receiving the object carrier. In particular, the diameter of the concave portion may be slightly larger than (e.g., within 3 cm or 5 cm of) the diameter of the object carrier.

The engaging element may be part of the concave portion of the diverting element. The concave portion of the engaging element may match a convex portion of the object carrier. For example, when the object carrier has the shape of a right circular cylinder, approximately half of a slice of the object carrier will fit within the concave portion of the diverting element.

As an alternative to the disc, the diverting element may include a lever for diverting the object carrier and a stopper for stopping subsequent object carriers from being conveyed toward the lever. In such cases, it may be that the diverting element is not a single physical entity but that instead the lever and the stopper are separate portions of the diverting element. The lever and stopper may be substantially bar-shaped. The stopper may be approximately one half or approximately one third the size of the lever. In particular, the length of the stopper may be approximately one half or approximately one third of the length of the lever.

As an alternative to the disc and the lever/stopper arrangement, the diverting element may be adapted to engage the object carrier from above via the engaging element. Accordingly, the diverting element may include a lateral opening for releasing the object carrier. The diverting element may cover the object carrier when the object carrier is engaged similar to the way a hood covers an object.

The conveyance system may further comprise an energy source for the diverting element. The energy source may include an electromechanical device, such as a slip ring. In addition or alternatively, the energy source may include an electromagnetic device, such as an inductive coupling device or a wireless slip ring. It is also possible that the energy source includes a battery. The energy source may be a combination of these devices or may be a single device.

The sensor element may be coupled to the energy source via the axis of rotation of the diverting element. For example, electrical signals may be passed wirelessly along the axis of rotation of the diverting element. In particular, power and data may be transferred or transmitted via the axis of rotation of the diverting element. In some cases, object sensing data obtained by the at least one sensor element can be transmitted to the control unit via the axis of rotation. Object sensing data may refer to data obtained by sensors relating to object carriers being conveyed on one of the conveyor lane sections. It is also possible that the sensor element is coupled to the energy source via a cable.

The control unit may be implemented as part of the diverting element or may be external to the diverting element. The control unit may receive sensor data from the sensor element and control rotation of the diverting element, and possibly, operation of the engaging element. In particular, the control unit may process sensor data and determine how to control the diverting element based on the sensor data. The control unit may also use the sensor data to determine when to activate/deactivate the engaging element and/or when to cause vertical movement of the diverting element. The control unit may include a processor and a memory coupled to the processor.

Wireless transmission of power and data may have the advantage of making the conveyance system easier to maintain and more reliable. Further, a wireless energy source may be less likely to contaminate the objects carried by the object carrier. This may be particularly advantageous when the object carrier carries pharmaceutical objects. Moreover, a system with fewer cable connections may be easier to manufacture and maintain.

At least two sensors of the plurality of sensors may use different sensor technologies. Moreover, at least two sensors of the plurality of sensors may be of different types. For example, one of the sensors may be a tactile sensor implemented using strain gauge technology and another of the sensors may be a proximity sensor implemented using capacitive sensing. Other combinations of sensors and technologies are also possible.

The sensor element may include one or more of the following sensor types:
   a tactile sensor placed where an object carrier will contact the diverting element or placed so as to measure a force generated by the object carrier that acts on the axis of rotation;
   a proximity sensor;
   an image sensor;
   a pressure sensor.

The image sensor may be located on top of the diverting element or located on an extension of the diverting element so as to be able to capture images of the first conveyor lane section The extension of the diverting element may be an arm or projection extending out from the body of the diverting element. The extension of the diverting element may be movable i.e. capable of adjustment. In particular, it may be possible to adjust the location of the image sensor. There may be multiple image sensors capable of capturing images of multiple conveyor lanes, different parts of conveyor lanes or the same section of a conveyor lane from different angles. In particular, the image sensor may be capable (e.g., via adjustment and/or use of the extension) of capturing images of the at least one first conveyor lane section and the at least two second conveyor lane sections. The image sensor may include a fish eye lens to create a wide panoramic or hemispherical image. The image sensor may be a camera.

The sensor element may include one or more sensors implemented using one of the following sensor technologies:
   capacitive sensing,
   a strain gauge,
   a discrete, linear or echo detection piezo transducer,
   an RFID reader,
   acoustic source localization,
   the magnetic hall effect.

For example, the sensor element may include one or more tactile sensors implemented as strain gauges or piezo transducers. The sensor element may also include, in addition of alternatively, resistive tactile sensors or a Radio Frequency Identification (RFID) reader capable of measuring the magnetic or electric field strength of an RFID response.

The image sensor may include a camera capable of performing object recognition. Alternatively, object recognition may be performed by the control unit. The control unit may be connected to the sensor element.

Proximity sensors may be implemented using capacitive sensing, acoustic source localization, magnetoresistance, the magnetic hall effect, RFID, or near field communication.

A combination of sensor technologies may be used. For example, the sensor element may include one proximity sensor implemented using capacitive sensing and another proximity sensor implemented using RFID. The sensor element may also include tactile sensors implemented using various technologies. Use of different technologies in the sensor element may have the advantage of improving reliability. For example, sensors implemented using different technologies may provide different information, which can be correlated in order to more accurately determine the position of the object carrier and/or when to rotate the diverting element. Further, different types of sensors (e.g. a tactile sensor and a proximity sensor) and different sensor technologies may fail at different times, thereby improving reliability (e.g., the control unit may be able to compensate for one or more failed sensors). Further, weaknesses in different types of sensors or in different sensor technologies may be compensated for by other types of sensors of sensor technologies.

It may be advantageous to include the sensor element as part of the diverting element rather than spreading sensors throughout the conveyance system. Such concentration of sensing functionality reduces the need for cabling in the conveyance system, making the system more reliable, precise, less expensive and easier to maintain. In particular, the conveyance system may require less cabling, e.g., for power and data transfer to and from the diverting element rather than at various points in the conveyance system. Further, the conveyance system may be simpler and more reliable, particularly because the software to control the system may be less complex and there may be fewer parts that can fail. Moreover, fewer sensors are needed and more precise sensing can be performed. Also, the sensor element on the diverting element can be more easily controlled in comparison to sensors located throughout the conveyance system.

Also, when the sensor element for detecting the object carrier is part of the diverting element, software for controlling the sensors can be simplified and the cabling and connections required can be reduced or even eliminated in a wireless solution. One reason for the simplification of the software is that inclusion of the sensor element as part of the diverting element eliminates the need for timing. In particular, in contrast to the conventional system described above, it is not necessary to calculate the amount of time that it will take for an object carrier detected by a through-beam sensor to reach the diverting element. Instead, inclusion of the sensor element in the diverting element ensures detection of the object carrier at a fixed distance from the diverting element and makes it easier to rotate the diverting element such that waiting time is minimized. Further, minimizing the detection distance allows the system to maximize throughput.

Also, when the sensor element includes a pressure sensor or proximity sensor, these sensors may be able to perform more precise sensing than photoelectric sensors, such as through beam sensors, located throughout the conveyance system.

In a conventional solution, sensors dispersed throughout the conveyance system need to be wired and configured one by one in software. In contrast, by including the sensor element as part of the diverting element, as soon as all sensors are located or even soldered on the same electronic device, they can be identified and configured all at once per diverting element. This may make initial configuration of the conveyance system easier and more efficient.

Use of the engaging element may enable the elimination of other mechanical parts within the conveyance system. In particular, the object carrier can be held by or fastened to the diverting element so that additional guiding components external to the diverting element, such as a rotatable gate, are not needed. For example, in some cases, the rotatable gate is placed downstream from the diverting element in order to help divert the object carrier between the first conveyor lane section and one of the two second conveyor lane sections. Use of the engaging element may make it possible to dispense with additional mechanical components external to the diverting element, such as the rotatable gate, which may be used to help divert the object carrier. Elimination of the rotatable gate may have the advantage of reducing the manufacturing cost of the conveyance system, making the system simpler to use and making the system easier to maintain.

The diverting element may be a single physical entity including the engaging element and the sensor element. For example, when the diverting element is or comprises the disc, the sensor element may be located on the disc or within the disc. Similarly, the engaging element may be integral to the disc or physically connected to the disc.

The single physical entity may include the energy source or an element thereof. Further, the single physical entity may include data transfer capability. The element of the energy source may be coils of a slip ring placed in the diverting element. A further element of the energy source may be a stationary element capable of transmitting energy and transmitting and receiving data.

According to another aspect, a method for conveying a plurality of object carriers via a conveyance system is provided. The method comprises conveying, via a first conveyor lane section, an object carrier toward a rotatable diverting element. The method further comprises detecting, via a sensor element of the rotatable diverting element, the object carrier when the object carrier is:
  being conveyed toward the diverting element, or
  contacting the diverting element, or
  being transported away from the diverting element by the conveyance system.

The method further comprises diverting, via the rotatable diverting element, the object carrier between the first conveyor lane section and one of the at least two second conveyor lane sections. The diverting element has an axis of rotation adjacent to the first conveyor lane section and the at least two second conveyor lane sections. The axis of rotation is perpendicular to a direction of conveyance of the first conveyor lane section and/or the at least two second conveyor lane sections. Both the first conveyor lane section and the at least two second conveyor lane sections are part of the conveyance system.

If the sensor element comprises a tactile sensor, the method may further comprise detecting the object carrier when the object carrier contacts the diverting element. If the sensor element comprises a proximity sensor or an image sensor, the method may further comprise detecting the object carrier when the object carrier is being conveyed toward the diverting element but not yet in contact with the diverting element.

The method may further comprise rotating the diverting element when the object carrier is close enough to the diverting element to be received by the diverting element. The method may further comprise detecting when the object carrier is being transported away from the diverting element. Detecting when the object carrier is close enough to the diverting element to be received by the diverting element may be carried out via the proximity sensor. Similarly, detecting when the object carrier is being transported away from the diverting element may be carried out via the proximity sensor. When the diverting element can be rotated without disrupting the movement of the object carrier being transported away from the diverting element, the method may further comprise rotating the diverting element to a receiving position such that the diverting element can receive another object carrier. Detecting when the diverting element can be rotated without disrupting the movement of the object carrier being transported away from the diverting element may be carried out via the proximity sensor.

In some cases, diverting the object carrier between the first conveyor lane section and the at least one of the second conveyor lane sections further comprises vertically moving the diverting element, the vertical movement causing an engaging element of the diverting element to engage or attach to an engaging portion of the object carrier. The vertical movement of the diverting element may occur upon determination that the object carrier is ready to be engaged. For example, the object carrier may arrive in the receiving position. Accordingly, the sensor element may detect that the object carrier is in contact with the diverting element. More specifically, a tactile sensor of the sensor element may be located within a concave portion of the diverting element and may detect that the object carrier is in contact with the concave portion. The detection may be reported to the control unit and lead to the determination that the object carrier is ready to be engaged.

The method may further comprise rotating the diverting element and the object carrier engaged with the diverting element from the first conveyor lane section to the at least one of the second conveyor lane sections. The method may further comprise vertically moving the diverting element. In addition, the method may comprise disengaging the engaging portion of the object carrier from the engaging element to allow the object carrier to move away from the diverting element. For example, the first vertical movement may be an upward movement and the second vertical movement may be a downward movement. Further, the first vertical movement may cause the object carrier to be fastened to the diverting element. The second vertical movement may cause the object carrier to be disengaged or unfastened from the diverting element.

DETAILED DESCRIPTION

Figure 1:
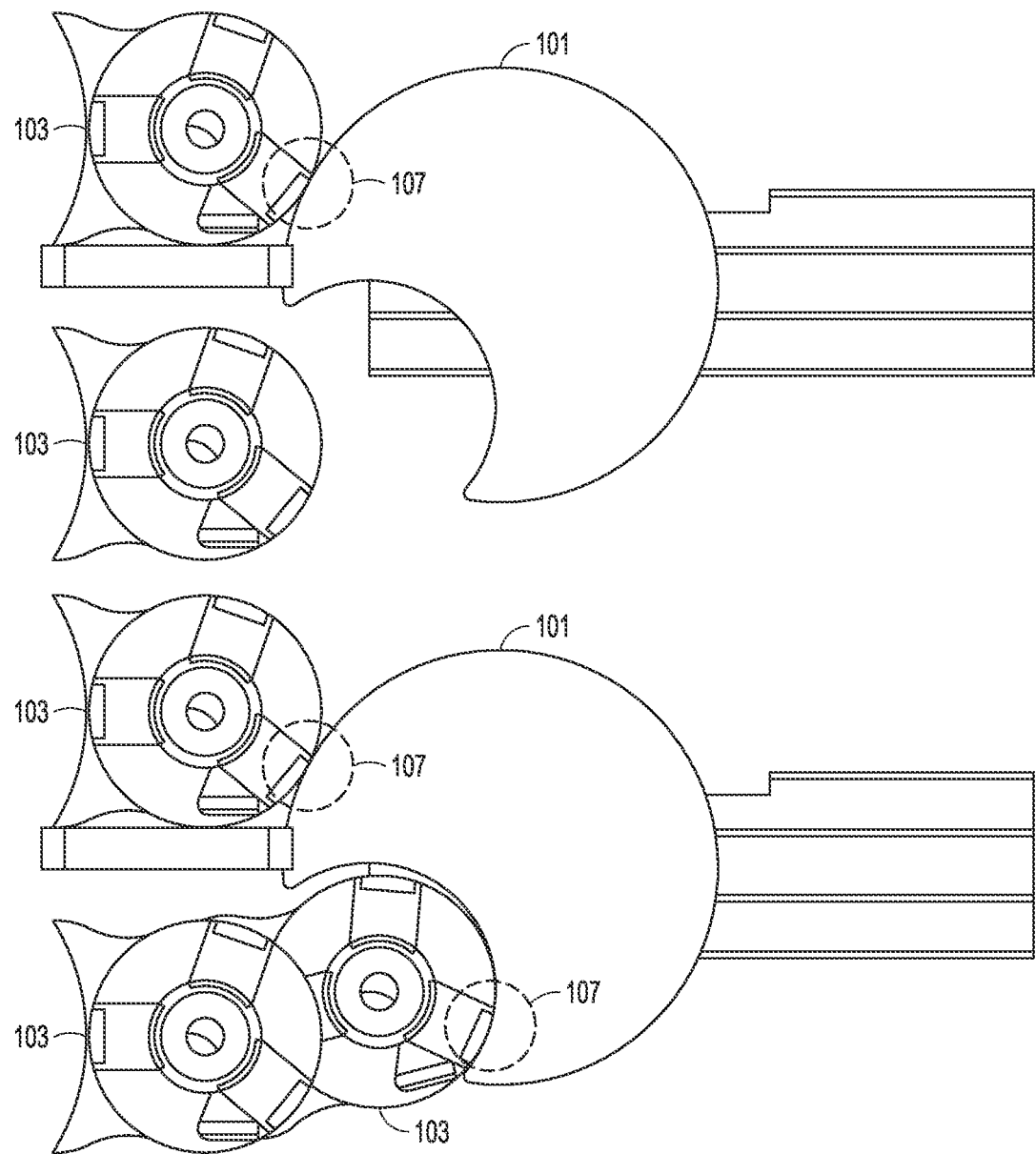
FIG. 1 shows parts of a conveyance system including a diverting element and multiple object carriers.

In the following text, a detailed description of examples will be given with reference to the drawings. It should be understood that various modifications to the examples may be made. In particular, one of more elements of one example may be combined and used in other examples to form new examples.

The conveyance system of the present disclosure may be used in a laboratory environment, for example, to produce pharmaceutical products. The conveyance system may include conveyor lanes adapted to convey object carriers. The objects carried by the object carriers may be samples or laboratory products. For example, the objects may be tubes, such as test tubes. The objects may be capped. The objects and/or object carriers may include RFID tags.

Each object carrier may be a holder suitable for carrying the objects described above. The object carriers may be substantially cylindrical. A typical object carrier may be made from one or more materials, e.g. plastic or metal. The object carriers may have substantially the same shape and be made from substantially the same materials. Object carriers may include wheels. Each object carrier may have a flat, smooth bottom. Further, each object carrier may have a form suitable for being conveyed by the conveyor lane sections.

The conveyance system may include conveyor lanes (also referred to as conveyors) capable of conveying or moving object carriers. The conveyor lanes may be chain or belt conveyors. The conveyance system may include at least one first conveyor lane section and at least two (i.e. multiple) second conveyor lane sections. Each first conveyor lane section may be paired with a corresponding second conveyor lane section to form a continuous conveyor lane capable of moving one of the plurality of object carriers. In some cases, each object carrier may be moved or transported by means of magnetic attraction caused by one of more magnets moved along a predetermined path.

Each first conveyor lane section may form a continuous single lane with no more than one second conveyor lane section. The first conveyor lane section may be parallel to one of the at least two second conveyor lane sections. The conveyor lanes may include borders or boundaries on one side (or both sides) of each lane. The borders may have gaps (e.g., around a diverting element). Adjacent lanes might not have borders or boundaries in order to allow an object carrier to be diverted between the adjacent lanes.

The object carrier may be orientation specific, such that the orientation of the object carrier should be maintained while the object carrier is traveling on the conveyance system. However, in some cases, it might not be necessary to transport orientation specific object carriers. The object carrier may include a drive device, such that the object carrier can propel itself along one of the conveyor lanes. The diverting element may be capable of turning off the power to drive the object carrier. Alternatively, the object carrier may be configured to stop as soon as the object carrier comes into contact with the diverting element. The object carrier may include structures for holding multiple tubes containing the same or different samples. In some cases, the conveyance system may be used to transport samples in an in vitro diagnostic laboratory. The samples may include bodily fluid, such as blood.

An implementation in which the diverting element includes a disc may have the advantage that throughput of the conveyance system can be increased. In particular, the lever stopper design may yield a maximum throughput of about 2400 objects (e.g., tubes) per hour. In contrast, when the diverting element includes the disc, the throughput may be increased to 2800 objects per hour.

FIG. 1 shows parts of a conveyance system 200 (see FIG. 2), including two rotatable diverting elements 101 and object carriers 103. Circular areas 107 show where conveyed object carriers may contact the diverting element 101. The object carrier 103 may be received in a concave portion 109 of the diverting element 101. In particular, the object carrier 103 may include a convex portion that is received in the concave portion 109. In some cases, the object carrier 103 may be substantially cylindrical.

The diverting element 101 may have multiple concave portions in order to increase throughput.

The diverting element 101 may rotate clockwise or counterclockwise. The diverting element 101 may rotate in such a way as to minimize disturbance of the object carrier 103 (e.g., prevent the object carrier 103 from contacting other object carriers).

The diverting element 101 may include a control unit in addition to a sensor element. Including the sensor element with the diverting element may have the advantage of enabling the object carrier 103 to be located more precisely. In particular, the object carrier 103 may be located more precisely in comparison to the localization of the object carrier 103 that is possible when sensors are positioned at different points in the conveyance system outside of or external to the diverting element 101.

The diverting element 101 may be initialized. During the initialization, the control unit may move the diverting element 101 to the closest receiving position or releasing position. In particular, the control unit may rotate the diverting element 101 in one direction (clockwise or counterclockwise to arrive at the closest receiving or releasing position). The control unit may then rotate the diverting element in the opposite direction to reach the next receiving or releasing position. In this way it may be ensured that there is no obstruction preventing rotation of the diverting element 101 between receiving and releasing positions.

Figure 2:
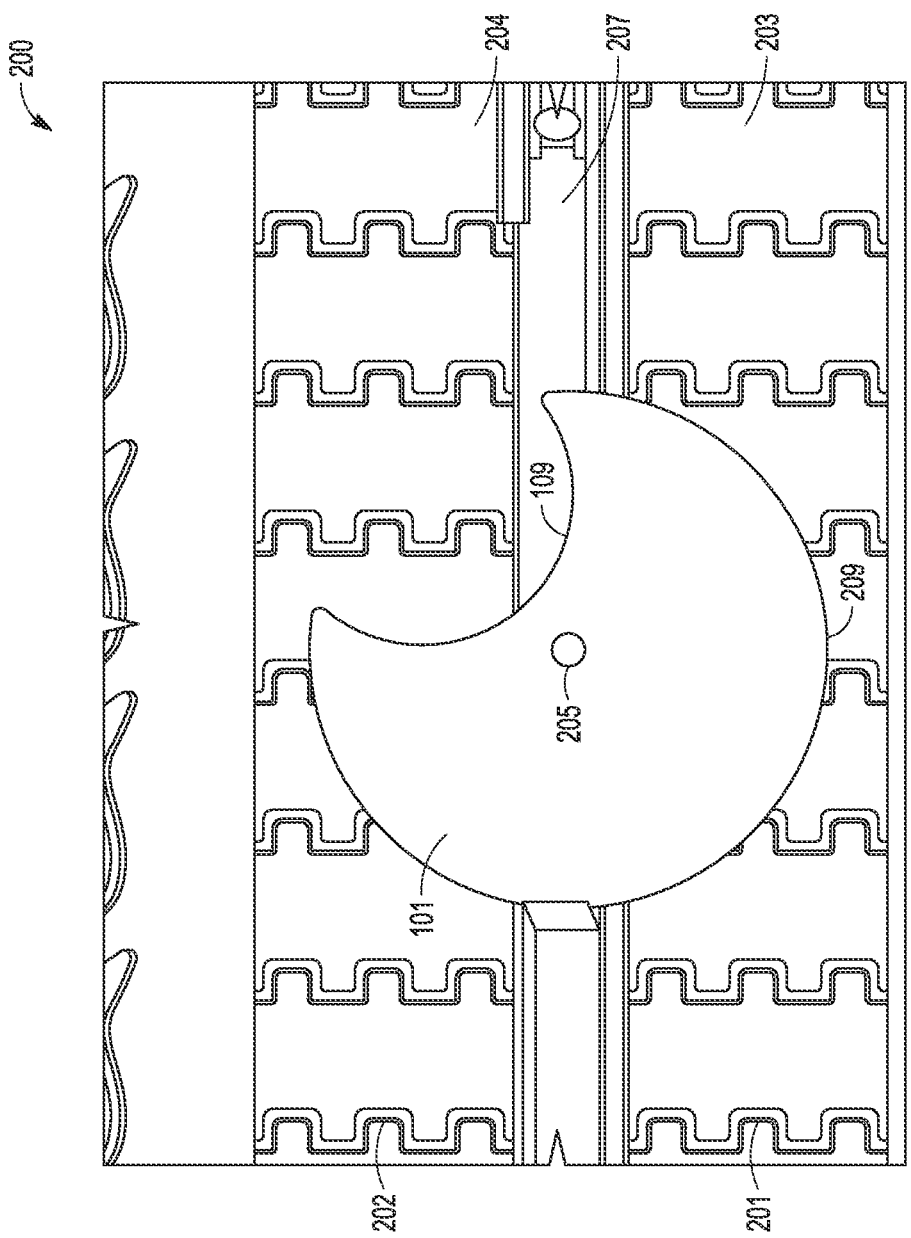
FIG. 2 shows parts of the conveyance system including the diverting element, and conveyor lane sections.

FIG. 2 shows the conveyance system 200. The conveyance system includes the diverting element 101. In addition, the conveyance system 200 includes two first conveyor lane sections 201, 202 and two second conveyor lane sections 203, 204. The diverting element 101 includes an axis of rotation 205 adjacent to one of the first conveyor lane sections 201, 202 and one of the second conveyor lane sections 203, 204. In the depicted example, the axis of rotation 205 is adjacent to both the first conveyor lane sections 201, 202 as well as to the second conveyor lane sections 203, 204. However, other arrangements are possible.

Each of the conveyor lane sections 201 to 204 may be part of corresponding conveyors. The conveyors may be powered by a drive system, engine, or motor.

The diverting element 101 is shown with the concave portion 109. The concave portion 109 may also be referred to as a semicircular cutout. The conveyor lane sections 201 to 204 may be implemented as metal tracks, more particularly, aluminum tracks. In the example of FIG. 2, two conveyor lanes are each composed of two conveyor lane sections. Thus, one conveyor lane includes the first conveyor lane section 202 and the second conveyor lane section 204 and another conveyor lane includes the first conveyor lane section 201 and the second conveyor lane section 203. The conveyor lanes 201,203 and 202,204 are logically divided by the diverting element 101. In the example depicted, the first conveyor lane sections 201 and 202 appear on the left side of the axis of rotation 205 and the second conveyor lane sections 203 and 204 appear on the right side of the axis of rotation 205.

The conveyance system 200 is also shown with a crossover bridge 207. The crossover bridge 207 is provided in between the second conveyor lane sections 203 and 204. In some cases, the crossover bridge 207 supports the object carrier 103 when the diverting element 101 diverts the object carrier 103 between one of the first conveyor lane sections 201,202 and one of the second conveyor lane sections 203,204. For example, the crossover bridge 207 could support the object carrier 103 when the diverting element 101 diverts the object carrier 103 between the first conveyor lane sections 201 and the second conveyor lane section 204. The diverting element 101 may have an outer surface 209.

The conveyor lanes including the conveyor lane sections 201 to 204 may be implemented as chain or belt conveyors.

Figure 3:
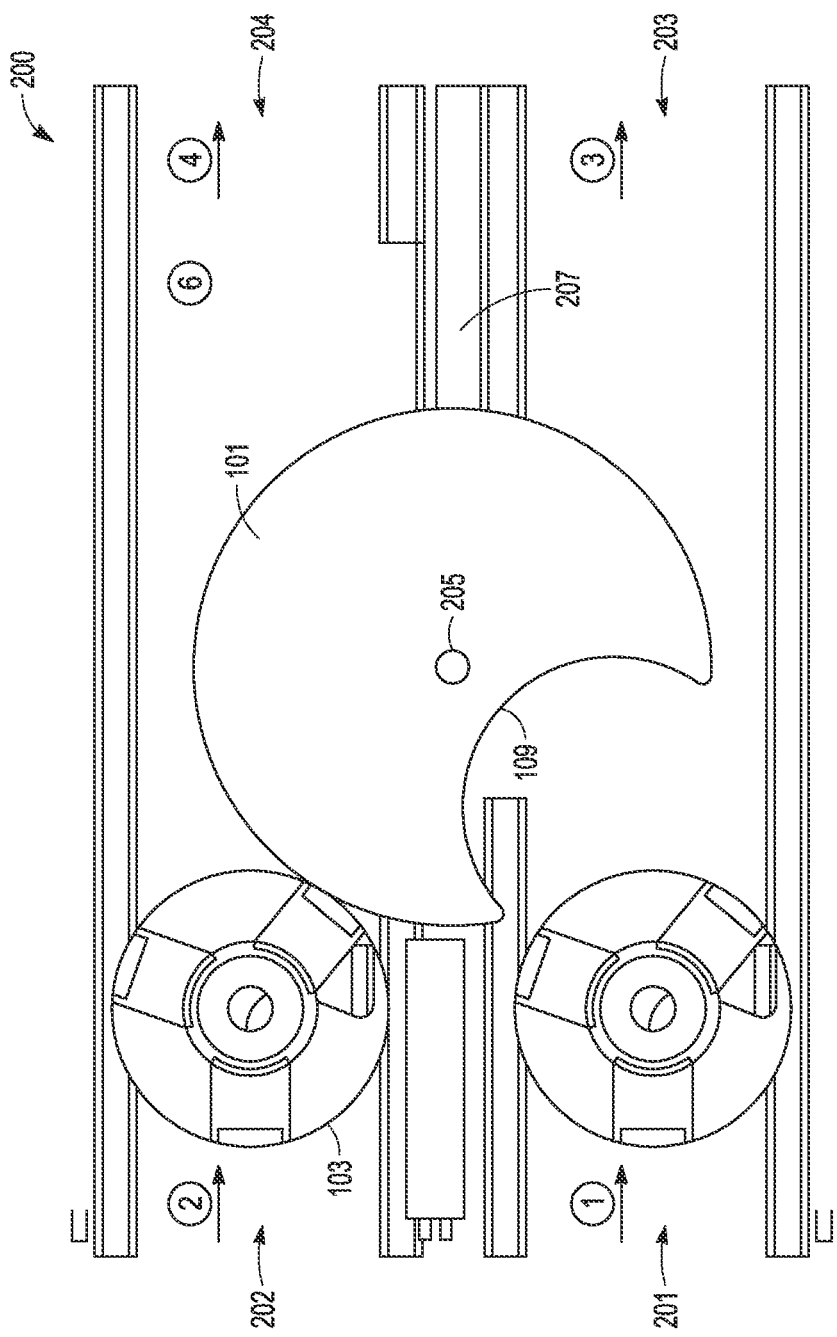
FIG. 3 shows two object carriers and a diverting element within part of the conveyance system.

FIG. 3 shows another example of the conveyance system 200. A single first conveyor lane section 201, 202 and a single second conveyor lane section 203,204 each form a continuous conveyor lane. For example, a first conveyor lane includes the first conveyor lane section 201 and the second conveyor lane section 203 and a second conveyor lane includes the first conveyor lane section 202 and the second conveyor lane section 204.

The object carrier 103 may move along the first conveyor lane section 201 until reaching the rotatable diverting element 101. The rotatable diverting element 101 may divert the object carrier 103 between the first conveyor lane section 201 and one of the at least two second conveyor lane sections 203,204.

A diameter of the diverting element 101 may be about equal to a combined width of one of the first conveyor lane sections 201,202 and one of the second conveyor lane sections 203,204. At position 1, the object carrier 103 may be detected by a sensor element of the diverting element 101. The presence of the object carrier 103 at position 1 may be detected by a proximity sensor of the diverting element 101. The proximity sensor may be part of the sensor element. Object sensing data obtained by the proximity sensor may be transmitted to the control unit of the diverting element 101. The transmission may be carried out wirelessly and may occur via the axis of rotation 205.

The control unit may determine whether the object carrier 103 should be diverted from first conveyor lane section 201 to the second conveyor lane section 203 or whether the object carrier 103 should be diverted from the first conveyor lane section 201 to the second conveyor lane section 204.

The diverting element 101 may rotate in a counterclockwise direction when diverting the object carrier 103 between the first conveyor lane section 201 and one of the second conveyor lane sections 203, 204 in order to avoid disturbing another object carrier 103 on the first conveyor lane section 202.

The sensor element may detect the presence of the object carrier 103 when the object carrier 103 is in the first conveyor lane section 201 or the first conveyor lane section 202. Use of the sensor element as part of the diverting element 101 may obviate the need for sensors along the conveyor lane sections 201 to 204. In addition, the sensor element of the diverting element 101 may be used to detect when the object carrier 103 has moved far enough away from the diverting element 101 such that the diverting element 101 may rotate away from the object carrier 103 in order to receive a new object carrier.

Upon detection of the object carrier 103 by the sensor element, the diverting element 101 may be rotated to a receiving position in which the object carrier can be received within the concave portion 109. Alternatively, the diverting element may already be in position to receive the object carrier 103 and may not need to be rotated. The object carrier 103 may be moved along the conveyor lane section 201 until the object carrier 103 is received by the diverting element 101 within the concave portion 109.

For example, a tactile or pressure sensor of the diverting element 101 may detect when the object carrier 103 is no longer in contact with the diverting element.

The tactile or pressure sensor of the diverting element 101 may determine that the diverting element 101 is ready to engage the object carrier 103 when the object carrier 103 contacts the diverting element 101. Alternatively or in addition, pressure sensors of the diverting element 101 may detect when the object carrier 103 is exerting a lateral force on the axis of rotation 205. For example, when the object carrier 103 is moving along the first conveyor lane section 201, and comes into contact with the concave portion 109, the object carrier 103 may begin to exert a lateral force on the axis of rotation 205, e.g. in the direction of movement of the conveyor lane section 201. Detection of the exertion of this lateral force may cause the diverting element to divert the object carrier 103 between the first conveyor lane 201 and one of the two second conveyor lane sections 203 or 204. In particular, detection of the lateral force may lead to a determination by the control unit that the diverting element is ready to engage the object carrier 103.

Upon determination that the diverting element 101 is ready to engage the object carrier 103, an engaging element of the diverting element 101 may engage an engaging portion of the object carrier 103. For example, a magnet of the engaging element may exert a magnetic force on a ferromagnetic portion of the engaging portion of the object carrier 103 to engage the object carrier 103. Once the engaging element of the diverting element 101 engages the object carrier 103, the diverting element 101 may rotate in a counterclockwise direction in order to divert the object carrier between the first conveyor lane section 201 and one of the second conveyor lane sections 203, 204.

If it is determined that the object carrier 103 should be diverted to the second conveyor lane section 203 rather than the second conveyor lane section 204, the diverting element 101 may rotate a quarter turn before disengaging the object carrier 103. Alternatively, if it is determined that the object carrier 103 should be diverted to the second conveyor lane section 204, then the diverting element 101 may rotate a half turn in the counterclockwise direction before disengaging the object carrier 103. The object carrier 103 may be released by the engaging element once the object carrier 103 is aligned with one of the second conveyor lane sections 203, 204.

Advantageously, use of the engaging element as part of the diverting element 101 may obviate the need for a rotatable gate 105 (see FIGS. 7 to 9 and 11) as well as control unit hardware and/or software to control the rotatable gate 105. Further, use of the engaging element may manufacturing an operation of the conveyance system 200 simpler and cheaper.

In the example of FIG. 3, the diverting element 101 is positioned to receive the object carrier 103 but the object carrier 103 has not yet progressed within the concave portion 109 of the diverting element 101.

Before receiving the object carrier 103, the diverting element may determine whether to divert the object carrier 103 to the second conveyor lane section 203 or the second conveyor lane section 204. In order to determine to divert the object carrier 103 from the first conveyor lane section 201 to the second conveyor lane section 204, rather than the second conveyor lane section 203, the control unit of the diverting element 101 may determine an identity of the object carrier 103 based on object sensing data obtained by the sensor element.

For example, the sensor element may include an RFID reader and the RFID reader may read an RFID tag of the object carrier 103. Alternatively, the control unit may be programmed to divert a predetermined number of object carriers 103 to the second conveyor lane section 204 before diverting further object carriers 103 to the second conveyor lane section 203.

Figure 4:
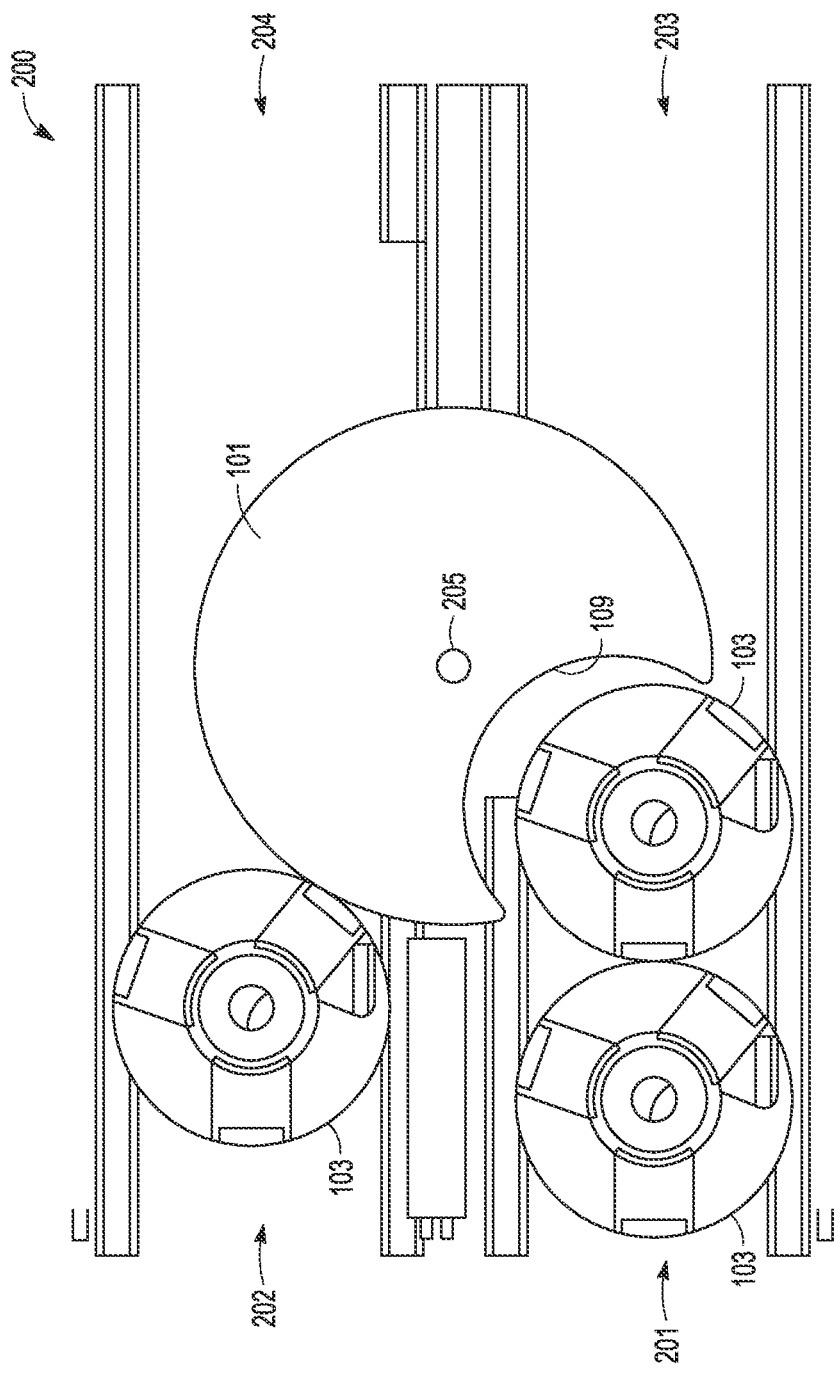
FIG. 4 begins diversion of an object carrier from a first conveyor lane section to a second conveyor lane section.

FIG. 4 shows another view of the conveyance system 200. In FIG. 4, the conveyance system 200 of FIG. 3 is shown after the object carrier 103 has been conveyed along the first conveyor lane section 201 toward the concave portion 109 of the diverting element 101. Accordingly, in the example of FIG. 4, the diverting element 101 is about to receive the object carrier 103.

Further, FIG. 4 shows the diverting element 101 when the diverting element 101 is in the receiving position for object carriers being conveyed along the first conveyor lane section 201.

The diverting element 101 may have multiple receiving positions. When the diverting element 101 is in one of the receiving positions, the diverting element 101 may be able to receive one of the object carriers 103 within the concave portion 109. In addition, the diverting element 101 may have multiple releasing (e.g., disengaging) positions.

When the diverting element 101 is in one of the releasing positions, the object carrier 103 may be positioned so as to be conveyed on one of the second conveyor lane sections 203 or 204.

Thus, the diverting element 101 may have receiving positions corresponding to each one of the first conveyor lane sections 201 and 202, and the diverting element 101 may have releasing positions corresponding to each one of the second conveyor lane sections 203 and 204. In other words, the diverting element 101 may have two receiving positions and two releasing positions.

The diverting element 101 may come to a stop in each of the receiving positions and releasing positions.

The diverting element 101 is again depicted as the rotatable disc with the concave portion 109. The diverting element 101 is shown in a position to receive the object carrier 103 in the concave portion 109.

Once the object carrier 103 has been received by the diverting element 101, the object carrier 103 may be engaged by an engaging element of the diverting element 101. The object carrier 103 may be engaged after a determination is made that the diverting element 101 is ready to engage the object carrier 103, e.g., as described above. The engaging element may engage the engaging portion of the object carrier.

Figure 9:
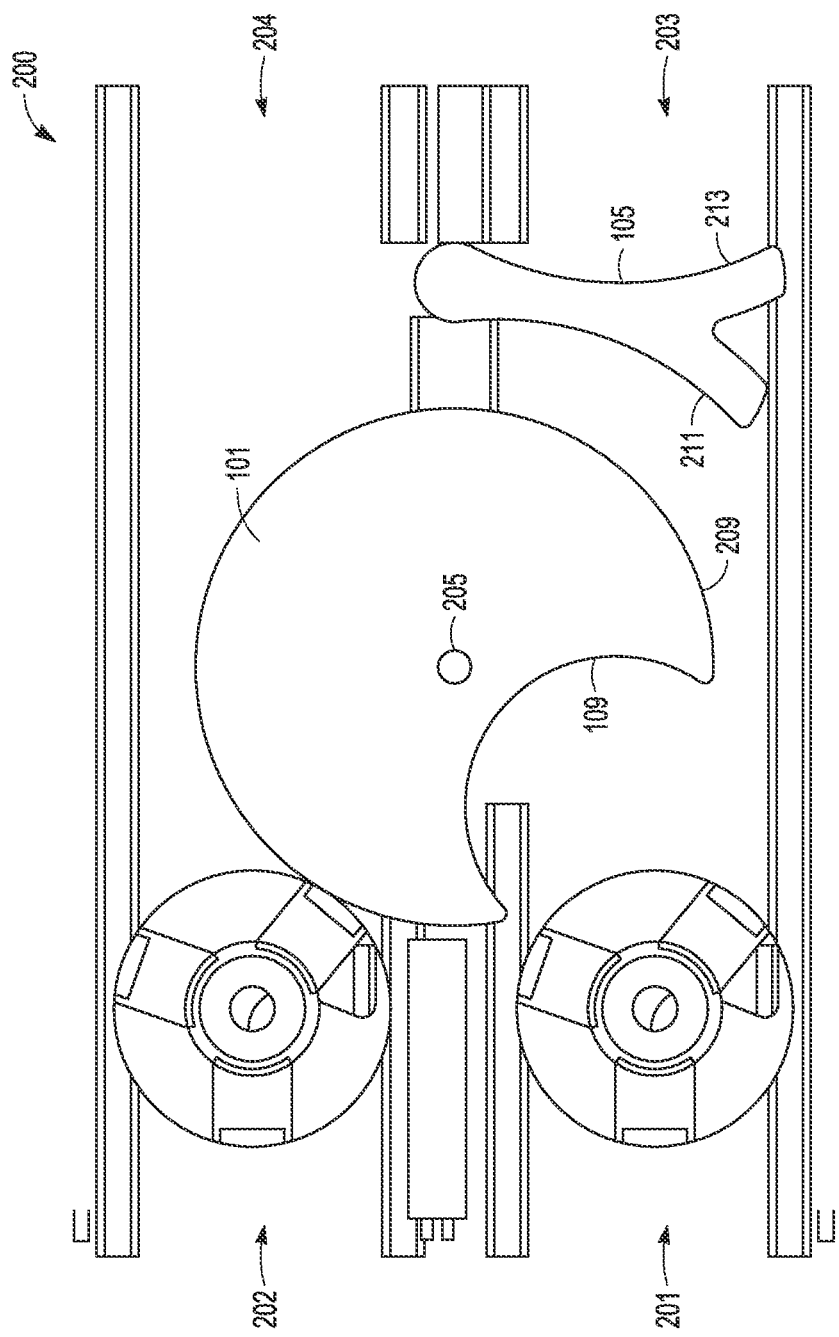
FIG. 9 shows yet another configuration of the diverting element and the rotatable gate.

Alternatively, the diverting element 101 may receive the object carrier 103 without engaging the object carrier 103 and may instead divert the object carrier 103 between the first conveyor lane section 201 and the second conveyor lane section 204 with the assistance of an external guide element, such as the rotatable gate 105 (see FIG. 9).

The diverting element 101 may rotate counterclockwise, e.g. in order to benefit from the assistance of the rotatable gate 105 (see FIG. 9) when diverting the object carrier 103 between the first conveyor lane section 201 and the second conveyor lane section 204. Further, the diverting element may detect the presence of the object carrier 103 in the first conveyor lane section 202. The control unit of the diverting element 101 may then determine, in response to the detection, to rotate counterclockwise in order to divert the object carrier 103 between the first conveyor lane section 201 and the second conveyor lane section 204.

Figure 5:
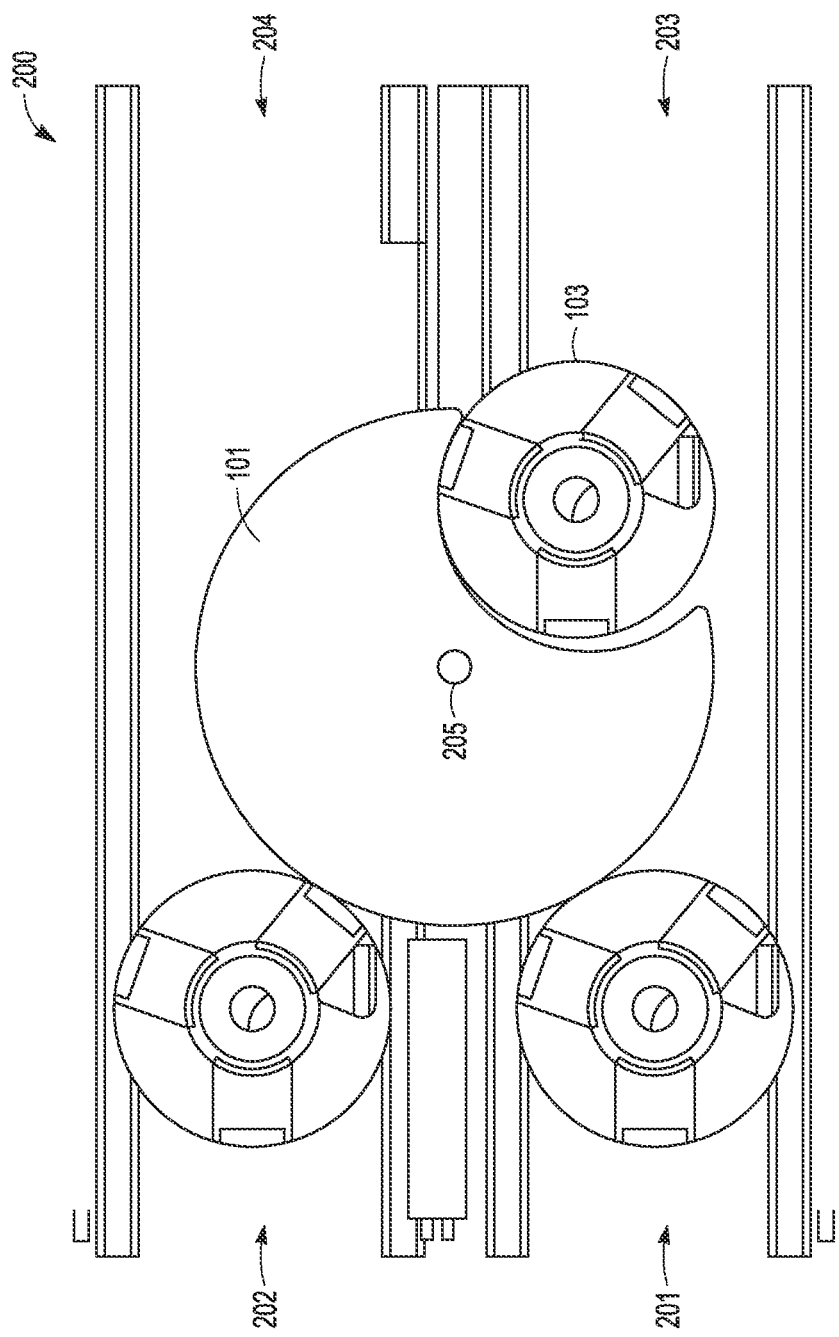
FIG. 5 continues diversion of the object carrier from the first conveyor lane section to the second conveyor lane section.

FIG. 5 shows the conveyance system 200 as the diverting element 101 is diverting the object carrier 103 between the first conveyor lane section 201 and the second conveyor lane section 204. In the example of FIG. 5, the engaging element is being used to divert of the object carrier from the first conveyor lane section 201 to the second conveyor lane section 204. However, it would be possible to use the rotatable gate 105 when the diverting element 101 is not equipped with the engaging element.

A determination may be made to rotate the diverting element 101 counterclockwise after the sensor element detects the object carrier 103 on the first conveyor lane section 202. Alternatively, the diverting element 101 may be configured to always rotate counterclockwise when diverting the object carrier 103 from the first conveyor lane section 201 to the second conveyor lane section 204. Rotation in different directions may be carried out under different circumstances.

Figure 6:
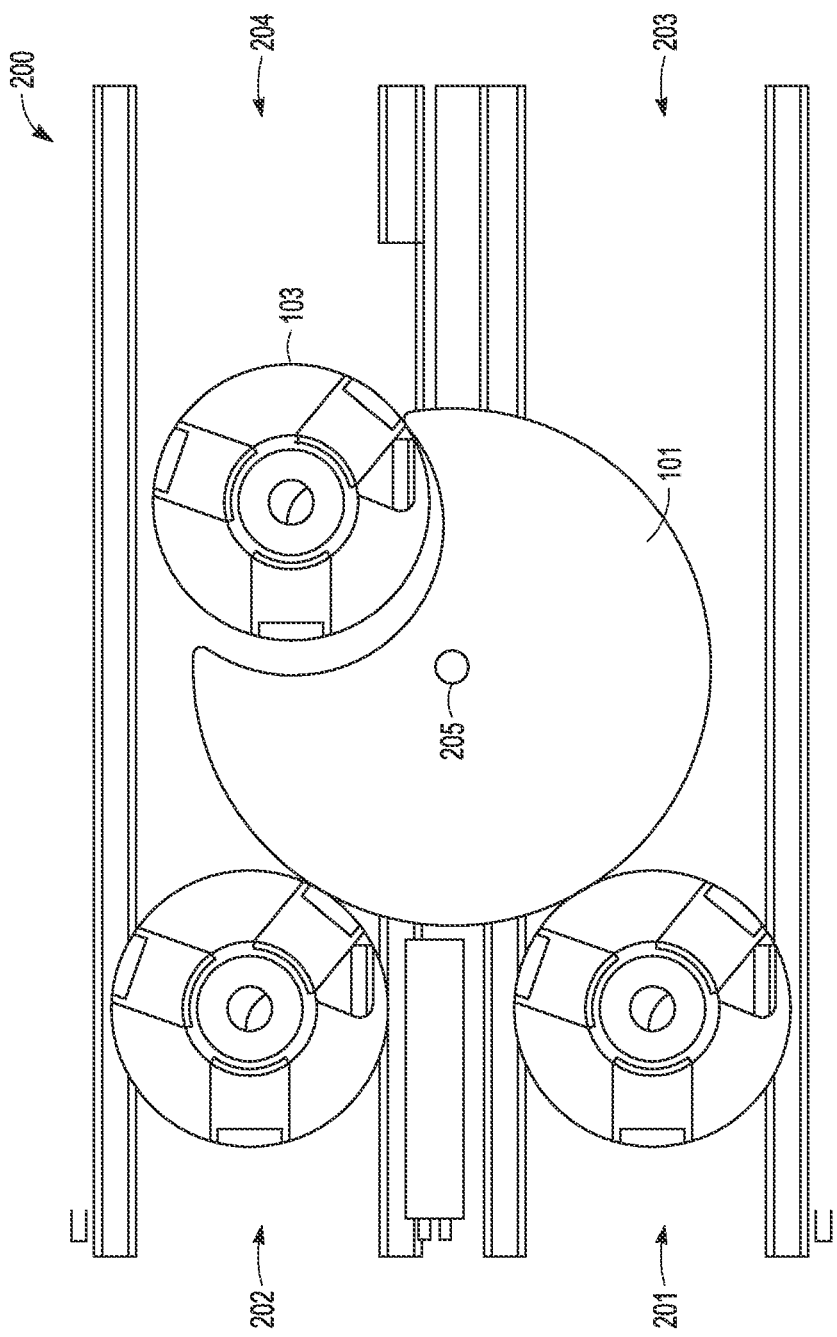
FIG. 6 shows the object carrier after it has been diverted from the first conveyor lane section to the second conveyor lane section.

FIG. 6 also shows the conveyance system 200. In the example of FIG. 6, the diverting element 101 has diverted the object carrier 103 from the first conveyor lane section 201 to the second conveyor lane section 204.

FIG. 6 shows the diverting element 101 in a releasing position, in which the object carrier 103 may be disengaged or released from the diverting element, corresponding to the second conveyor lane section 204. The diverting element 101 may also have another releasing position corresponding to the second conveyor lane section 203.

Accordingly, the engaging portion of the object carrier 103 may disengage from the engaging element of the diverting element 101 in order to allow the object carrier 103 to move away from the diverting element 101. Movement of the second conveyor lane section 204 may cause the object carrier 103 to move away from the diverting element 101. In some cases, the engaging element might not be used.

For example, the object carrier 103 may be diverted from the first conveyor lane section 201 to the second conveyor lane section 204 by means of the diverting element 101. Release (e.g. disengagement) of the engaging portion of the object carrier from the engaging element of the diverting element 101 may be triggered when the diverting element rotates to a certain position such that the object carrier 103 is able to move along the second conveyor lane section 204. In particular, the object carrier 103 may be conveyed along the second conveyor lane section 204 after being released (e.g. disengaged) from the diverting element 101.

In addition or alternatively, the object carrier 103 may be passively engaged via the engaging element. The engaging may be caused by vertically moving the diverting element and causing a corresponding vertical movement of the object carrier 203 engaged with the diverting element 101.

The engaging portion of the object carrier 103 may be implemented mechanically. In particular, the engaging portion of the object carrier 103 may be implemented as a protrusion of the object carrier 103 that fits into a corresponding aperture in the diverting element 101 or may be implemented as a protrusion of the diverting element 101 fits into a corresponding aperture in the object carrier 103.

Further, the engaging element may include a magnet (e.g., an electromagnet) that engages with ferromagnetic material of the engaging portion of the object carrier 103.

The diverting element 101 may interact with the object carrier 103 in such a way that the object carrier 103 does not contact the borders of the conveyor lanes 201 to 204 or extend past the edge of one of the conveyor lane sections 201 to 204 while being diverted.

Figure 7:
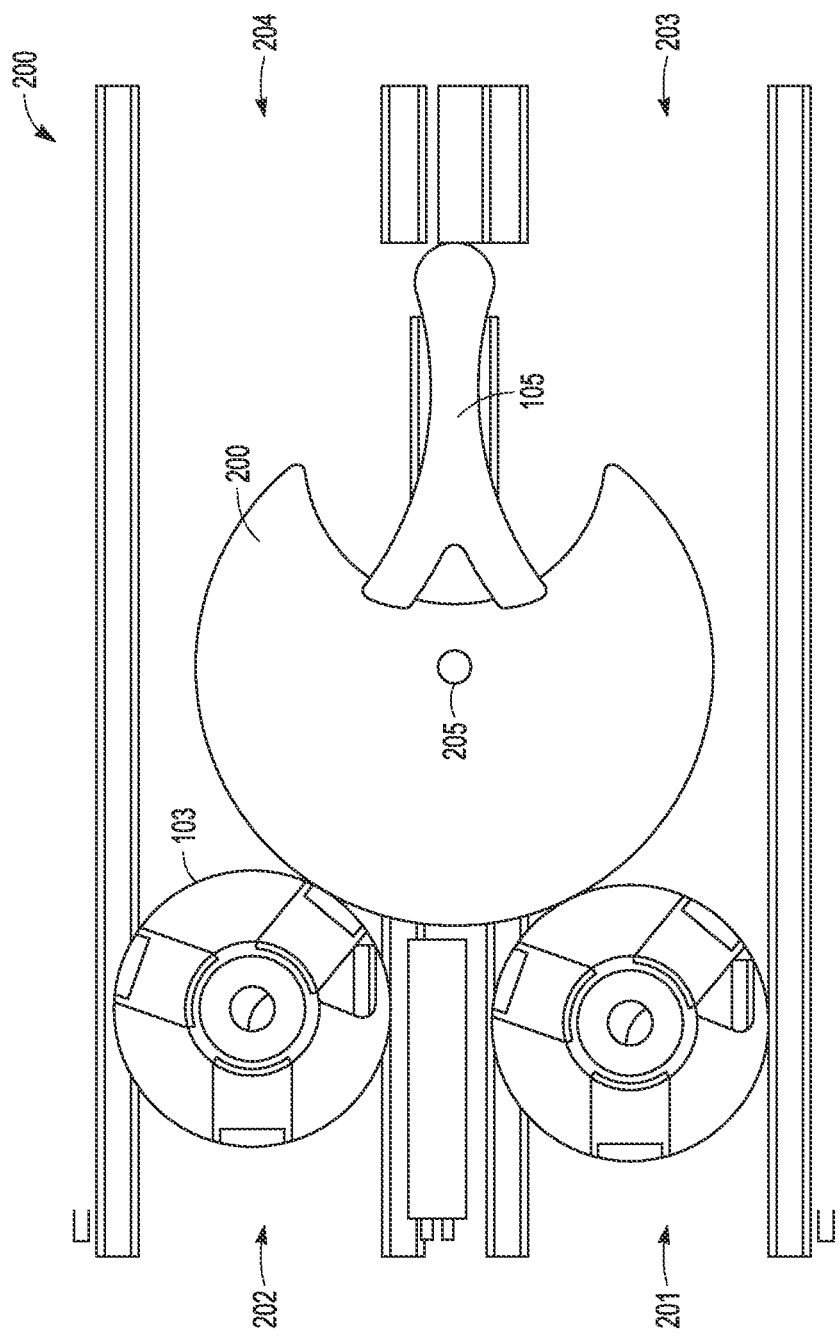
FIG. 7 shows the diverting element and a rotatable gate.

FIG. 7 shows a home or idle position of the diverting element 101. The conveyance system 200 depicted in FIG. 7 includes the rotatable gate 105. According to the example depicted, the rotatable gate 105 is used to help maintain the diverting element 101 in the home or idle position. However, other means may also be used. Accordingly, as shown, the rotatable gate 105 is oriented along the direction of conveyance of the conveyor lane sections 201 to 204. In other words, the rotatable gate 105 is parallel to the direction of conveyance of the conveyor lane sections 201 to 204. The diverting element 101 may prevent the object carriers 103 from moving further along the conveyor lane sections 201 to 204. In particular, the diverting element 101 may prevent the rotatable object 103 from moving from the first conveyor lane sections 201 and 202 to the second conveyor lane sections 203 and 204 when the diverting element 101 is in the home position, as shown in FIG. 7.

In other embodiments, the rotatable gate 105 might not be present, and the diverting element 101 may maintain itself in the home position. According to the depicted example, the longitudinal axis of the rotatable gate 105 may be oriented toward the concave portion 109 of the diverting element 101. In particular, the Y shaped end of the rotatable gate 105 may extend within the concave portion 109 of the diverting element 101, such that the rotatable gate 105 contacts an inner part of the concave portion 109 of the diverting element 101.

Figure 8:
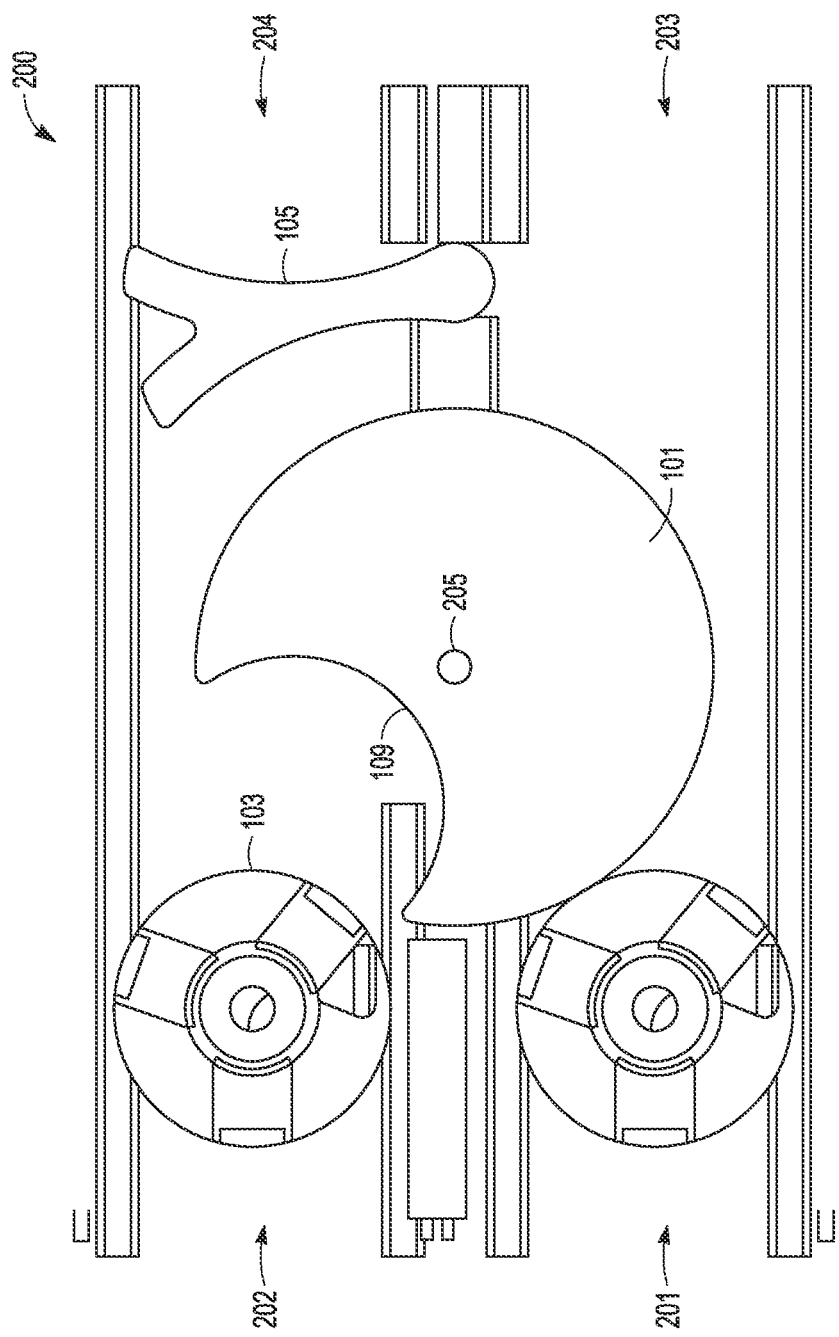
FIG. 8 shows another configuration of the diverting element and the rotatable gate.

FIG. 8 shows the diverting element 101 when the diverting element 101 is in the receiving position to receive the object carrier 103 being conveyed on the first conveyor lanes section 202.

In the example of FIG. 8, once the diverting element 101 has received the object carrier 103 in the concave portion 109, the diverting element 101 may rotate in a clockwise direction in order to avoid disturbing the object carrier 103 on the first conveyor lane section 201. The diverting element 101 may rotate about the axis of rotation 205. The direction of conveyance may be left to right in the depicted example. Accordingly, the axis of rotation 205 may represent a Z axis, i.e. a vertical axis, while the object carrier is conveyed in the horizontal direction, i.e. from left to right.

FIG. 9 illustrates movement of the diverting element 101 and the rotatable gate 105 between conveyor lane sections, i.e. between receiving positions and releasing positions.

In particular, FIG. 9 shows the diverting element 101 at the receiving position corresponding to the first conveyor lane section 201. From this position, the diverting element 101 may move in a counterclockwise direction toward one of the two releasing positions or in a clockwise direction toward the receiving position corresponding to the first conveyor lane section 202. The diverting element 101 may rotate faster when there is no object container within the concave portion 109 in comparison to the speed of rotation when the object container 103 is within the concave portion 109.

As shown in FIG. 9, the rotatable gate 105 may have a Y shape with two elongated side sections 211 and 213. The elongated side section 211 of the rotatable gate 105 may complement the outer surface 209 of the diverting element 101. In particular, the curvature of the diverting element 101 may correspond to the curvature of the rotatable gate 105 in such a way that the object carrier 103 can be smoothly diverted between the first conveyor lane section 201 and the second conveyor lane sections 204.

Figure 10:
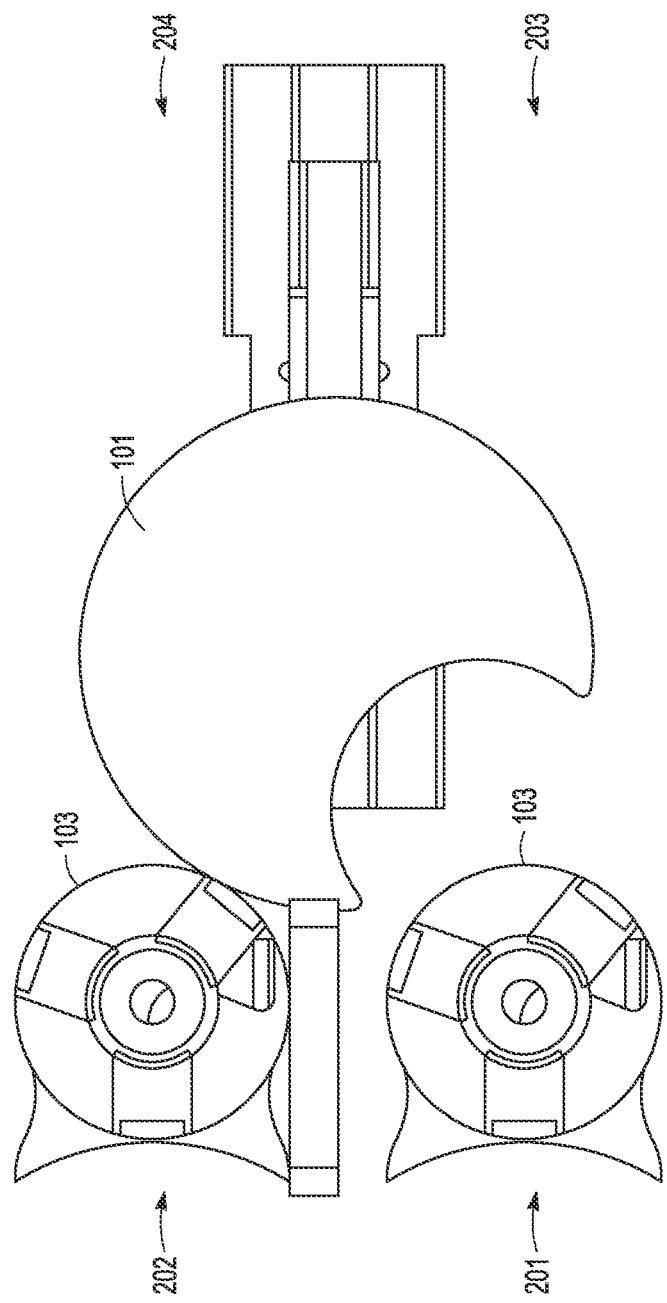
FIG. 10 shows the diverting element and two object carriers.

FIG. 10 illustrates the diverting element 101 and two object carriers 103. The diverting element 101 may rotate in order to divert one of the object carriers 103 between one of the first conveyor lane sections 201,202 and one of the second conveyor lane sections 203,204. For example, the diverting element 103 may divert the object carrier 103 between the first conveyor lane section 201 and the second conveyor lane section 204 until the object carrier 103 is on the second conveyor lane section 204. The diverting element 101 may include at least one sensor element for detecting the object carrier. For example, the sensor element may detect the object carrier 103 at one or more points while the object carrier is being conveyed toward the diverting element, the sensor element (possibly via a further sensor) may detect the object carrier 103 when the object carrier 103 contacts the diverting element 101. The sensor element (possibly via yet another sensor) may detect the object carrier 103 when the object carrier 103 is being transported (i.e. moved) away from the diverting element, e.g., on the second conveyor lane section 204.

Figure 11:
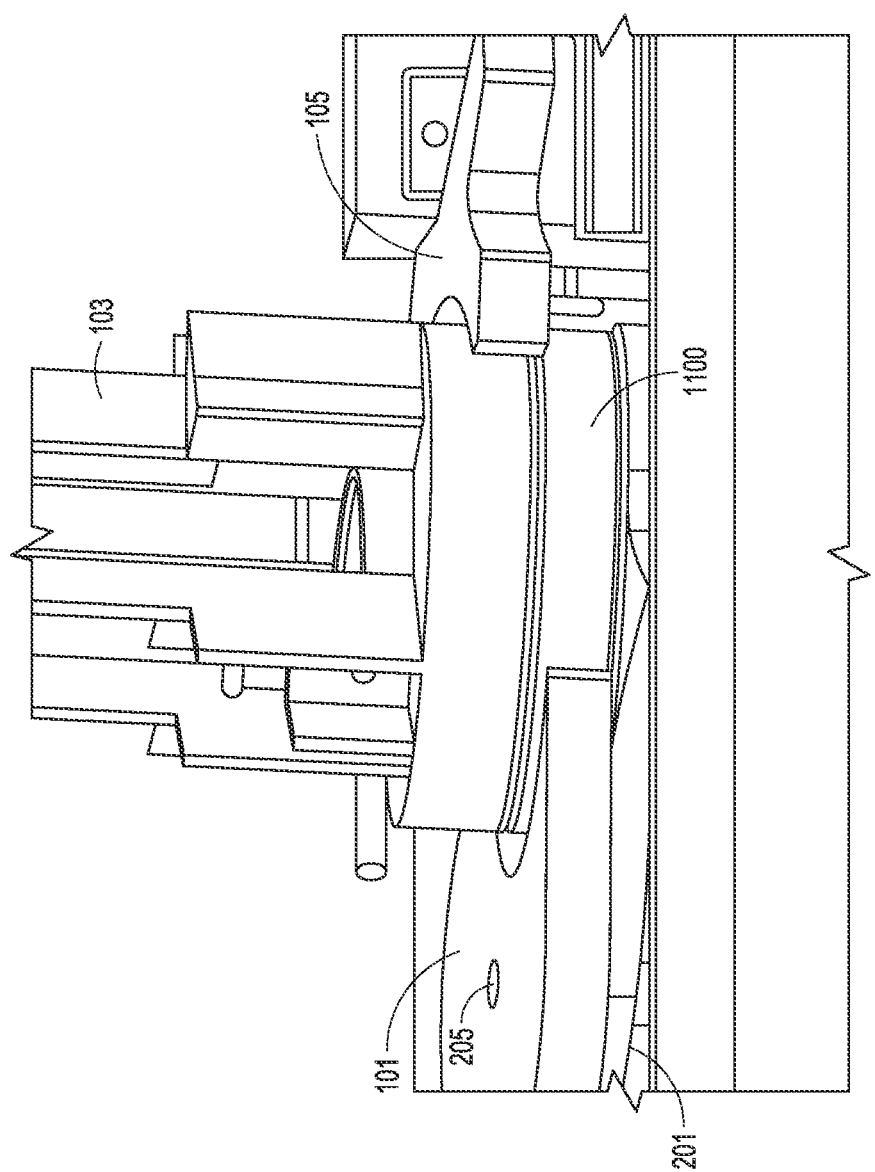
FIG. 11 shows a side view of the diverting element and the rotatable gate.

FIG. 11 shows a side view of part of the conveyance system 200. The depicted example includes the rotatable gate 105 the diverting element 101, the axis of rotation 205, the first conveyor lane section 201 and a bottom surface 111 of the object carrier 103. The bottom surface 111 may be smooth, thereby making it possible to move or slide the object carrier 103 smoothly between the at least one first conveyor lane section 201 and one of the at least two second conveyor lane sections 203 and 204. More specifically, there may be a low friction coefficient (e.g., less than 0.5 or less than 0.3) between the bottom surface 111 and the conveyor lane sections 201 to 204, such that the object carrier 103 can slide smoothly from one of the first conveyor lane sections 201 and 202 and to one of the second conveyor lane sections 203 and 204 without disrupting or disturbing the objects being carried by the object carrier 103.

In some cases, the diverting element 101, particularly the sensor element of the diverting element 101, may include an RFID reader. The RFID reader may read information associated with the object carrier 103 or objects carried by the object carrier 103. In particular, one or more RFID tags may be placed on objects carried by the object carrier 103. In addition or alternatively, one or more RFID tags may be placed on the object carrier 103 itself. In some cases, different RFID tags may be provided on different parts of the object carrier 103. This may enable the diverting element 101 or the control unit of the diverting element 101 to determine the orientation of the object carrier 103 on one of the first conveyor lane sections 201 or 202. Further, the control unit may be able to determine the orientation that the object carrier 103 should have after being diverted from one of the first conveyor lane sections 201 or 202 to one of the second conveyor lane sections 203 or 204. The engaging element of the diverting element 101 may engage with the object carrier 103 accordingly in order to ensure that the object carrier 103 has the correct orientation after being diverted.

Figure 12:
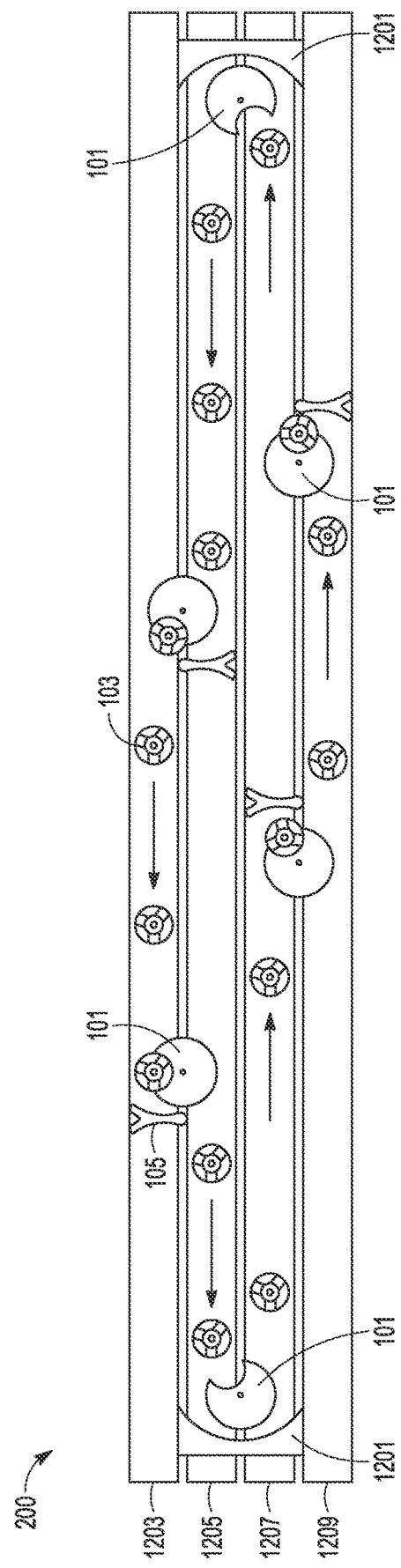
FIG. 12 shows a four lane conveyance system coupled to end of lane conveyance systems.

FIG. 12 shows another example of the conveyance system 200. According to the depicted example, the conveyance system 200 has four conveyor lanes. In addition, deflector elements 1201 are also depicted. The deflector elements 1201 may be used to change direction of movement of one of the object carriers 103. In particular, the deflection element 1201 may be used to cause an object carrier moving toward the deflection element 1201 on one conveyor lane to move away from the direction element 1201 on a different conveyor lane. This may be achieved by means of one of the diverting elements 101 located adjacent to the deflection element 1201.

Rotation of the diverting element 101 may cause one of the object carriers 103 to be diverted from one of the conveyor lanes to another of the conveyor lanes. For example, one object carrier 103 headed toward one of the diverting elements 101 on the conveyor lane 1205 may be diverted to the conveyor lane 1207 when the diverting element 101 rotates in a counterclockwise direction toward the deflecting element 1201. Similarly, the object carrier 103 moving on the conveyor lane 1207 toward the diverting element 101 may be diverted by means of the diverting element 101 and the deflecting element 1201 to the conveyor lane 1205 when the diverting element 101 receives the object carrier 103 and rotates in the counterclockwise direction.

The deflecting elements 1201 may not be needed when the diverting elements 101 include engaging elements.

The conveyance system 200 may include multiple rotatable gates 105. Alternatively, the rotatable gates 105 may be dispensed with if the diverting elements 101 include engaging elements.

Figure 13:
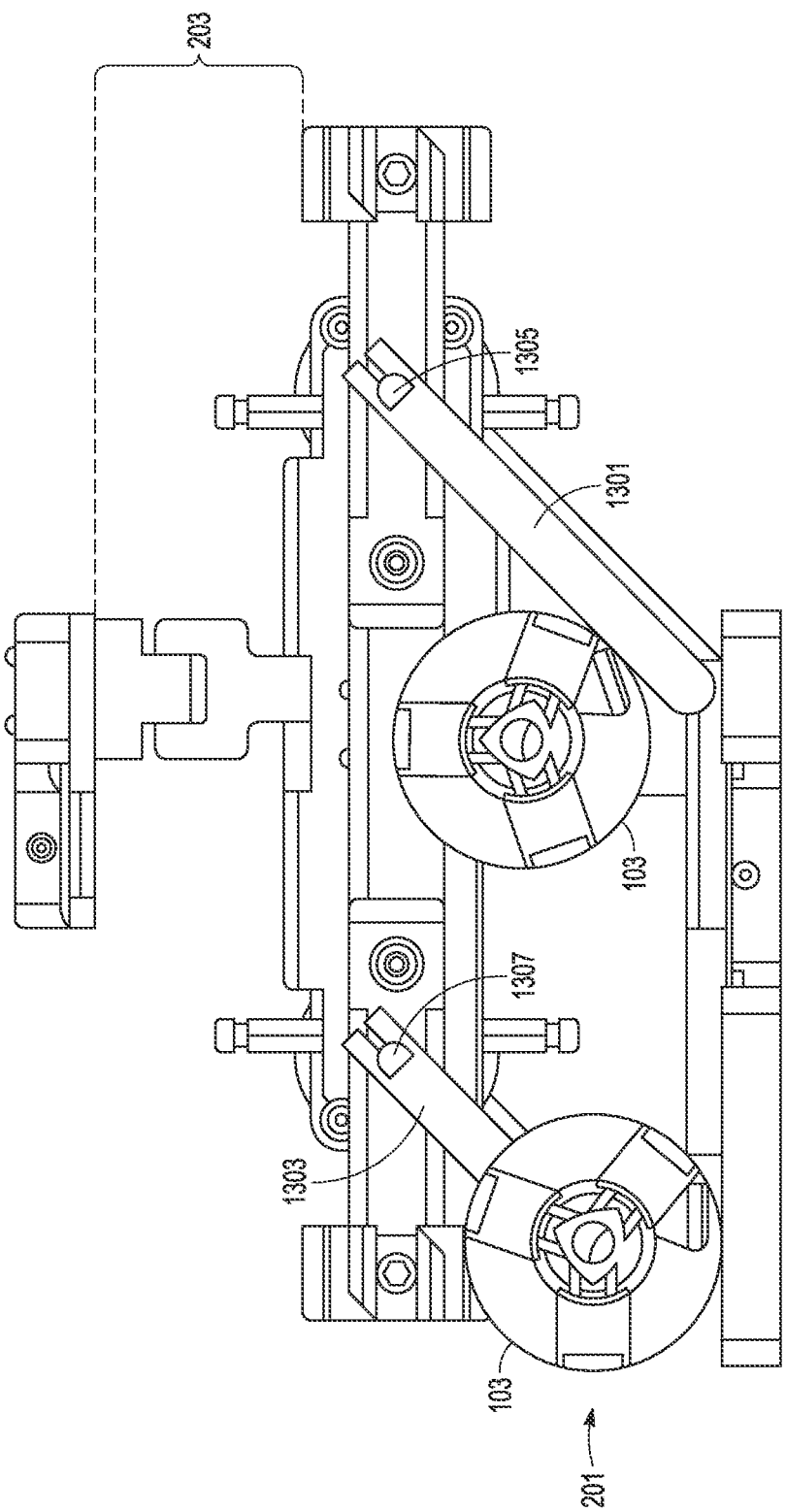
FIG. 13 shows a diverting element implemented as a lever and a stopper.

FIG. 13 shows another implementation of the diverting element 101. In the depicted example, the diverting element 101 includes a lever 1301 and a stopper 1303. The lever 1301 diverts the object carrier 103 between the first conveyor lane section 201 and the second conveyor lane section 203. One of more sensors of the sensor element may be located on or within the lever 1301. In addition, one or more sensors of the sensor element may be located on or within the stopper 1303. An axis of rotation 1305 of the lever 1301 may be adjacent to the second conveyor lane section 203. An axis of rotation 1307 of the stopper 1303 may be adjacent to the first conveyor lane section 201. In this example, it is possible that the axis of rotation 1305 is not adjacent to any of the first conveyor lane sections. In addition, it is possible that the axis of rotation 1307 is not adjacent to any of the second conveyor lane sections. The axis of rotation 1305 and the axis of rotation 1307 may both be perpendicular to the direction of conveyance of the first conveyor lane section 201 and the second conveyor lane section 203.

In the example of FIG. 12, the axis of rotation of each of the diverting elements 101 may be perpendicular to the direction of conveyance of each of the conveyor lanes 1203, 1205, 1207, and 1209. The lever 1301 and/or the stopper 1303 may include the engaging element. For example, both the lever 1301 and the stopper 1303 may include a magnet. A corresponding engaging portion of the object carrier 103 may include a ferromagnetic portion. Other sensor technologies or implementations of the engaging element may be included in either the lever 1301 or the stopper 1303.

Figure 14:
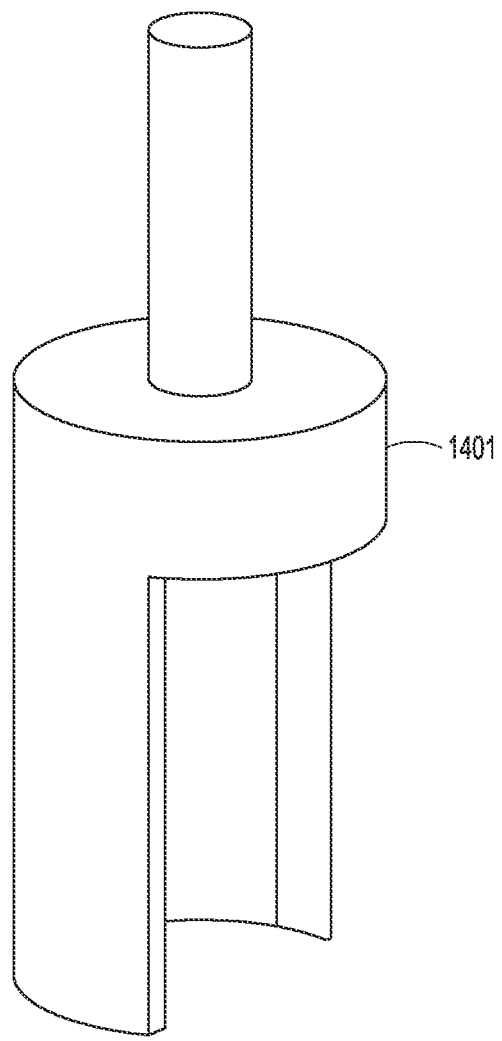
FIG. 14 shows a diverting element including a hood.

FIG. 14 shows another embodiment of the diverting element 101. In this example, the diverting element 101 includes a hood 1401. Accordingly, in this embodiment, the diverting element 101 covers the object carrier when the object carrier is engaged.

LIST OF REFERENCE NUMERALS

101 Diverting element
103 Object carrier
105 Rotatable gate

107 Area of contact
109 Concave portion
200 Conveyance system
201,202 First conveyor lane section
203,204 Second conveyor lane section
205 Axis of rotation of the diverting element
207 Crossover bridge
209 Outer surface of the diverting element
211,213 Elongated sections of the rotatable gate
215 Axis of rotation of the rotatable gate
1100 Smooth bottom surface of the object carrier
1201 Deflecting element
1203, 1205,1207, 1209 Conveyor lanes
1301 Lever
1303 Stopper
1305 Axis of rotation of the lever
1307 Axis of rotation of the stopper
1401 Hood

The invention claimed is:

1. A conveyance system for conveying a plurality of object carriers, comprising:
at least one first conveyor lane section;
at least two second conveyor lane sections; and
a rotatable diverting element for diverting an object carrier of the plurality of object carriers between the at least one first conveyor lane section and one of the at least two second conveyor lane sections, the diverting element comprising:
at least one sensor element for detecting the object carrier when the object carrier is
being conveyed toward the diverting element, or
contacting the diverting element, or
being transported away from the diverting element by the conveyance system;
an engaging element for
engaging the object carrier, which has been detected by the sensor element, while the object carrier is being diverted between the first conveyor lane section and one of the second conveyor lane sections, wherein the engaging comprises holding the object carrier in place while the object carrier is being diverted between the first conveyor lane section and one of the second conveyor lane sections, and
releasing the engaged object carrier when diverting of the object carrier is completed; and
an axis of rotation adjacent to the first conveyor lane section and/or one of the second conveyor lane sections, wherein the axis of rotation is perpendicular to a direction of conveyance of the first conveyor lane section and/or the two second conveyor lane sections.

2. The conveyance system of claim 1, wherein the engaging element is configured to engage a corresponding engaging portion on the object carrier,
wherein the diverting element and the object carrier are configured such that, after the engaging element engages the engaging portion, a first vertical movement of the diverting element causes a corresponding vertical movement of the object carrier,
wherein the diverting element and the object carrier are configured such that, after rotation of the diverting element, a second vertical movement of the diverting element leads to a disengagement of the engaging portion of the object carrier from the engaging element of the diverting element.

3. The conveyance system of claim 2, wherein the engaging element includes one or more of the following:
at least one magnet,
a fastening device, and
a suctioning device.

4. The conveyance system of claim 1, wherein the diverting element includes a disc,
wherein the disc includes a concave portion extending from the periphery of the disc toward the center of the disc.

5. The conveyance system of claim 1, wherein the diverting element includes a lever for diverting the object carrier and a stopper for stopping subsequent object carriers from being conveyed toward the lever.

6. The conveyance system of claim 1, wherein the diverting element is adapted to engage the object carrier from above via the engaging element, wherein the diverting element includes a lateral opening for releasing the object carrier.

7. The conveyance system of claim 1, wherein an energy source for the diverting element includes one of the following:
an electromechanical device, such as a slip ring;
an electromagnetic device, such as an inductive coupling device; and
a battery.

8. The conveyance system of claim 7, wherein the sensor element is coupled to the energy source via the axis of rotation of the diverting element, and
wherein object sensing data obtained by the at least one sensor element can be transmitted to a control unit wirelessly via the axis of rotation.

9. The conveyance system of claim 1, wherein the sensor element includes one or more of the following sensor types:
a tactile sensor placed where one of the object carriers will contact the diverting element or placed so as to measure a force generated by the object carrier that acts on the axis of rotation;
a proximity sensor;
an image sensor located on top of the diverting element or located on an extension of the diverting element so as to be able to capture images of the first conveyer lane section; and
a pressure sensor.

10. The conveyance system of claim 1, wherein the sensor element is implemented using one of the following sensor technologies:
capacitive sensing;
a strain gauge;
a discrete, linear or echo detection piezo transducer;
an RFID reader;
acoustic source localization; and
the magnetic hall-effect.

11. The conveyance system of claim 9, wherein the sensor element includes a plurality of sensors, wherein at least two sensors of the plurality of sensors use different sensor technologies and/or are of different sensor types.

12. A method for conveying a plurality of object carriers via a conveyance system, the method comprising:
conveying, via a first conveyor lane section, an object carrier toward a rotatable diverting element;
detecting, via a sensor element of the rotatable diverting element, the object carrier when the object carrier is:
being conveyed toward the diverting element, or
contacting the diverting element, or
being transported away from the diverting element by the conveyance system; and diverting, via the rotatable diverting element, the object carrier between the first conveyor lane section and one of at least two second conveyor lane sections, wherein the diverting comprises engaging, via an engaging element of the diverting element, the object carrier which has been detected by the sensor element while the object carrier is being diverted between the first conveyor lane section and one of the second conveyor lane sections, wherein the engaging comprises holding the object carrier in place while the object carrier is being diverted between the first conveyor lane section and one of the second conveyor lane sections;

releasing, by the engaging element, the engaged object carrier when diverting of the object carrier is completed;

wherein the diverting element has an axis of rotation adjacent to the first conveyor lane section and/or one of the at least two second conveyor lane sections, wherein the axis of rotation is perpendicular to a direction of conveyance of the at least one first conveyor lane section and/or the at least two second conveyor lane sections.

13. The method of claim 12, wherein if the sensor element comprises a tactile sensor, detecting the object carrier when the object carrier contacts the diverting element; and if the sensor element comprises a proximity sensor or an image sensor, detecting the object carrier when the object carrier is being conveyed toward the diverting element, and the method further comprises:

rotating the diverting element when the object carrier is close enough to the diverting element to be received by the diverting element, detecting when the object carrier is being transported away from the diverting element, when the diverting element can be rotated without disrupting the movement of the object carrier being transported away from the diverting element, rotating the diverting element to a receiving position such that the diverting element can receive another object carrier.

14. The method of claim 12, wherein diverting the object carrier between the first conveyor lane section and the at least one of the second conveyor lane sections further comprises:

determining that the object carrier is ready to be engaged;

upon determination that the object carrier is ready to be engaged, vertically moving the diverting element, the vertical movement causing an engaging element of the diverting element to engage an engaging portion of the object carrier;

rotating the diverting element and the object carrier engaged with the diverting element from the first conveyor lane section to the at least one of the second conveyer lane section; and vertically moving the diverting element, thereby causing the engaging portion of the object carrier to disengage from the engaging element and allowing the object carrier to move away from the diverting element.

* * * * *